US007452391B2

(12) United States Patent
Russell et al.

(10) Patent No.: US 7,452,391 B2
(45) Date of Patent: Nov. 18, 2008

(54) FEEDFORWARD CONTROL PROCESSES FOR VARIABLE OUTPUT HYDROGEN GENERATORS

(75) Inventors: Bradley P. Russell, Wheaton, IL (US); John R. Harness, Elgin, IL (US); Paul G. Blommel, Blue Mounds, WI (US); Daniel R. Sioui, Arlington Heights, IL (US); Suheil F. Abdo, Lincolnshire, IL (US); Kurt M. Vanden Bussche, Lake in the Hills, IL (US); Robert J. Sanger, Chicago, IL (US)

(73) Assignee: HyRadix Inc., Des Plaines, IL (US)

( * ) Notice: Subject to any disclaimer, the term of this patent is extended or adjusted under 35 U.S.C. 154(b) by 326 days.

(21) Appl. No.: 10/522,274

(22) PCT Filed: Jul. 30, 2003

(86) PCT No.: PCT/US03/23759

§ 371 (c)(1), (2), (4) Date: Sep. 2, 2005

(87) PCT Pub. No.: WO2004/054013

PCT Pub. Date: Jun. 24, 2004

(65) Prior Publication Data

US 2006/0096175 A1 May 11, 2006

Related U.S. Application Data

(63) Continuation-in-part of application No. 10/209,486, filed on Jul. 30, 2002, now abandoned.

(51) Int. Cl.

| | |
|---|---|
| ***C10J 1/28*** | (2006.01) |
| ***H01M 8/00*** | (2006.01) |
| ***H01M 8/04*** | (2006.01) |
| ***H01M 8/18*** | (2006.01) |
| ***C01B 3/00*** | (2006.01) |
| ***C01B 3/32*** | (2006.01) |
| ***G05D 7/00*** | (2006.01) |
| ***G05D 16/00*** | (2006.01) |
| ***G05B 17/00*** | (2006.01) |

(52) U.S. Cl. ..................... 48/195; 48/197 R; 48/127.7; 48/198.8; 48/199 R; 422/105; 422/107; 422/108; 422/110; 422/112; 422/116; 429/17; 429/19; 429/22; 429/24; 429/25; 429/13; 429/23

(58) Field of Classification Search .................. 429/17, 429/19, 22, 24, 25, 13, 23; 48/197 R, 127.7, 48/198.78, 199 R, 195; 422/105, 107, 108, 422/110, 112, 116

See application file for complete search history.

(56) References Cited

U.S. PATENT DOCUMENTS

| | | | | |
|---|---|---|---|---|
| 3,621,217 | A * | 11/1971 | Carr et al. | 700/31 |
| 4,145,999 | A * | 3/1979 | Aoki | 123/696 |
| 4,261,856 | A * | 4/1981 | McMinn, Jr. | 252/373 |
| 4,477,413 | A * | 10/1984 | Carson | 422/62 |
| 4,838,020 | A * | 6/1989 | Fujitsuka | 60/784 |
| 5,712,052 | A * | 1/1998 | Kawatsu | 429/13 |
| 5,989,503 | A * | 11/1999 | Wiesheu et al. | 422/198 |
| 6,266,576 | B1 * | 7/2001 | Okada et al. | 700/245 |
| 6,267,792 | B1 | 7/2001 | Nagamiya et al. | |
| 6,322,917 | B1 * | 11/2001 | Acker | 429/17 |
| 6,391,484 | B1 * | 5/2002 | Keskula et al. | 429/13 |
| 6,565,817 | B1 * | 5/2003 | Kiryu | 422/220 |
| 6,852,307 | B1 * | 2/2005 | Kuipers et al. | 423/651 |
| 2001/0041275 | A1 * | 11/2001 | Belschner et al. | 429/19 |
| 2001/0051290 | A1 * | 12/2001 | Kashiwagi | 429/9 |
| 2002/0015870 | A1 * | 2/2002 | Cownden et al. | 429/19 |
| 2002/0094461 | A1 * | 7/2002 | Skala et al. | 429/17 |
| 2002/0182460 | A1 * | 12/2002 | Okamoto | 429/23 |
| 2002/0182463 | A1 * | 12/2002 | Jones et al. | 429/23 |
| 2003/0039871 | A1 | 2/2003 | Christen et al. | |

FOREIGN PATENT DOCUMENTS

| | | |
|---|---|---|
| EP | 1 182 723 A2 | 2/2002 |
| EP | 1 187 241 A | 3/2002 |

* cited by examiner

*Primary Examiner*—Walter D. Griffin
*Assistant Examiner*—Huy-Tram Nguyen
(74) *Attorney, Agent, or Firm*—Stephen A. Gratton

(57) ABSTRACT

Hydrogen generators and integrated hydrogen generator/fuel cells systems are operated by determining the condition of the hydrogen generator and the condition of the fuel to the hydrogen generator for selection of predetermined flow rates for each of the externally-provided raw materials. The processes of the invention can provide rapid transitions between hydrogen production rates while enabling enhanced efficiency and stability during transient operations.

19 Claims, 10 Drawing Sheets

FEEDFORWARD CONTROL PROCESSES FOR VARIABLE OUTPUT HYDROGEN GENERATORS

CROSS-REFERENCE TO RELATED APPLICATION

This application is a Continuation-In-Part of application Ser. No. 10/209,486 filed Jul. 30, 2002 now abandoned, the contents of which are hereby incorporated by reference.

FIELD OF THE INVENTION

This invention pertains to processes for operating variable output hydrogen generators and integrated hydrogen generator/fuel cell systems. The processes include control processes that enable rapid transitions to reflect changes in output demand

BACKGROUND OF THE INVENTION

Fuel cells convert hydrogen and oxygen to water, releasing energy as usable electricity without employing combustion as an intermediate step. Unfortunately, the use of fuel cells has been limited especially where a rapid change in electricity demand is required such as in residential applications. The problem is that the rate of hydrogen supply to the fuel cell must rapidly change in order to accommodate varying electrical loads.

One could use a reservoir of hydrogen from which to supply the fuel cell, and the replenishment of hydrogen to the reservoir would therefore not be subjected to accommodating the rapid changes in hydrogen demand. However, such a solution is impractical, especially for residential use, due to difficulties and risks associated with such storage. Moreover, hydrogen storage equipment adds to the size and cost thereby reducing the attractiveness of a fuel cell for residential use. Alternatively, electricity could be stored in batteries, which serve as a buffer between the fuel cell system and the electrical load. Batteries, especially of the volume required to meet the needs of residential units, also add to the cost and size of the fuel cell system. Moreover, batteries have a limited life and must be replaced. Another approach is to store electricity in a super capacitor. While the size and cost of a super capacitor may be attractive, the disadvantage is the limited storage capacity.

Ideally, hydrogen would be generated on-site on an as needed basis for the fuel cell by the reforming (e.g., steam reforming and autothermal reforming) of fuels such as methanol, ethanol, natural gas, propane, butane, gasoline and diesel. Such fuels have high energy storage densities, have conventional storage protocols and have a nationwide supply infrastructure.

Although technology exists for the generation of hydrogen by reforming fuels, the implemented production processes are not able to quickly change the rate of hydrogen generation so as to be useful in a residential fuel cell application. For instance, hydrogen is widely produced for chemical and industrial purposes by converting suitable fuel material in a reforming process to produce a synthesis gas. Such chemical and industrial production usually takes place in large facilities that operate under steady-state conditions.

On-site hydrogen supply for fuel cells used in smaller mobile and stationary facilities, including residential-scale facilities, poses substantial problems even without the added complexities of operating at varying production rates. For instance, hydrogen generators for fuel cells must be smaller, simpler and less costly than hydrogen plants for the generation of industrial gases. Furthermore, hydrogen generators for use with fuel cells will need to be integrated with the operation of the fuel cell such that energy storage requirements are minimized. Moreover, the hydrogen generators must in combination with the fuel cells, be economically viable both in terms of purchase cost and cost of operation, and they must be sufficiently compact to meet consumer desires.

The challenge associated with providing smaller scale hydrogen generators is readily apparent from the number of unit operations required to convert fuel to hydrogen suitable for use in a fuel cell. The fuel must be brought to temperatures suitable for reforming which are often in excess of 600° C. The fuel is reformed to produce hydrogen and carbon monoxide, and the reformate is subjected to water gas shift at lower temperatures to convert carbon monoxide and water to hydrogen and carbon dioxide. Residual carbon monoxide is removed from the hydrogen-containing gas. Additionally, pre-treatment operations are generally required to treat the fuel to remove sulfur, a catalyst poison.

These unit operations must be conducted in an energy efficient manner. Consequently, the overall process should be highly heat integrated. As can be readily appreciated, changes in hydrogen production would be expected to take some time as each of the unit operations and heat exchange operations respond. The severity of the problem in changing hydrogen generation rates is exacerbated in that the range of operation of residential units needs to be quite wide, often the turndown ratio must be at least 5:1.

The difficulties in providing a hydrogen generator for use with fuel cells is further exacerbated because carbon monoxide is a poison to certain fuel cells such as PEM (polymer electrolyte membrane or proton exchange membrane) fuel cells. The water gas shift reaction is the primary operation used in a hydrogen generator to remove carbon monoxide generated by the reforming of the fuel. Any upset in the operation of the water gas-shift reactor can result in an increase in carbon monoxide that must be removed in downstream treatment of the hydrogen-containing gas. While redundant capacity for carbon monoxide removal (e.g., a selective oxidation) may be used in downstream operations to handle spikes in carbon monoxide production, such an approach will incur a penalty in process efficiency and product purity, as well as compactness and cost of the system. Accordingly, the hydrogen generator must be able to accommodate changes in the hydrogen production rate without adversely effecting the water gas shift operation.

Typically, hydrogen generators are controlled by adjusting the rate of fuel in response to the demand for hydrogen and then measuring process conditions such as burner, reformer and/or water gas shift reactor temperature to control the rate of oxygen-containing gas or water introduction to the hydrogen generator. Similarly, other process conditions can be controlled by measurement and direct feedback to the underlying feed or other process variable. This direct feedback control technique can accommodate the specific design of the hydrogen generator. For instance, direct feedback control of process variables that affect process temperatures such as the rate of oxygen-containing gas feed and water introduction will accommodate heat loss to the environment at variable hydrogen production rates.

Although the use of process condition measurement has met with acceptance, it is not without drawbacks. The two primary disadvantages are slow transient response and instability during transitions, especially rapid transitions. Instability occurs when the direct feedback control results in the operating variable (directly controlled variable) being set too high or too low and the process condition (measured condition), such as temperature, overshoots or undershoots the desired value. Slow response and instability can result in not only loss of efficiency but also can adversely affect the hydrogen product purity and, in some instances, can result in damage to catalyst and equipment.

Copending U.S. patent application Ser. No. 09/815,189, filed Mar. 22, 2001, which is commonly assigned, discloses, inter alia, processes for operating a fuel processor during a transition to a greater hydrogen production rate wherein increased amounts of oxygen-containing gas are provided to the preferential oxidation reactor in anticipation of the increased production rate in order to avoid or attenuate carbon monoxide concentration peaks. This document is hereby incorporated by reference in its entirety.

U.S. Pat. No. 6,267,792 discloses a control apparatus and control method for operating a reformer having a partial oxidation reforming section. The amount of oxygen to be supplied is determined based on an amount of reformate fuel contribution to the partial oxidation reaction, which is determined based on a ratio between a theoretical endothermic value in the endothermic reforming reaction and a theoretical exothermic value in the partial oxidation reaction. The patentees state that the controller determines an amount of time from supply of the raw material to occurrence of the reforming reaction and the partial oxidation reaction, and adjusts the determined amount of supply of oxygen based on that amount of time. The control apparatus may also include a detector for detecting the temperature of the reformer and controlling the supply of oxygen based on the detected temperature so as to maintain the sought temperature with a higher degree of precision. See also U.S. published patent application 2002/0031450.

U.S. Pat. No. 6,322,917 discloses methods for controlling preferential oxidation of carbon monoxide in a reformate stream. In one aspect, the patentees discuss calibrating the fuel cell system at different operating points by determining a target rate for injecting an oxidant into the preferential oxidizer stage for each of the operating points, storing results of calibrating the fuel system in memory, injecting oxidant into the preferential oxidizer stage, while running the fuel system to produce power, at a rate that is determined by the stored results, and while running the fuel system to produce power, periodically, recalibrating the fuel cell to update the stored results.

U.S. Pat. No. 6,565,817 relates to a reformer for a fuel cell. The apparatus disclosed has a load variation detector to detect the variation of a load of a power generating unit of the fuel cell. The detected load variation is supplied to a control device that adjusts a valve for the supply of fuel. The blower controlling air supply for the partial oxidation in the reformer and the valve for controlling the amount of fuel are set on the basis of the calculated air supply and fuel supply.

SUMMARY OF THE INVENTION

The processes of this invention pertain to operating hydrogen generators, especially hydrogen generators integrated with fuel cells, having a variable hydrogen production output rate such that the operation of the hydrogen generators exhibits enhanced efficiency and stability and maintains hydrogen product purity during transitions among hydrogen production rates. In an aspect of the processes of this invention, feedforward, rather than feedback, is used to define the control of the hydrogen generator.

In one broad aspect of the invention, a hydrogen generator is operated at steady state or in transition within a range of hydrogen production rates wherein in response to a hydrogen production rate demand request, externally-provided raw materials are introduced at effective feed rates into the hydrogen generator to meet the the requested hydrogen production rate demand. The improvement of this invention comprises:

a) determining the condition of the hydrogen generator and the condition of the hydrocarbon-containing feed,
b) selecting predetermined feed rates for the externally-provided raw materials based upon the determined condition of the hydrogen generator and the condition of the hydrocarbon-containing feed, and
c) controlling the feed rate of each of the externally-provided raw materials to substantially the selected predetermined feed rates.

The externally-provided materials comprise fuel (hydrocarbon-containing feed), oxygen-containing gas, and water. Not only can the control processes of this aspect of the invention avoid instability and/or undue time lags characteristic of control systems requiring feedback, but also the control processes can enhance efficiency and reduce time in effecting changes in hydrogen production rate while maintaining desired hydrogen product purity. This is achieved because the rates of feed of the externally-provided raw materials are predetermined to effect the change, or transition, to the sought hydrogen production rate.

In these processes, fuel is reformed at elevated temperature to produce reformate containing hydrogen and carbon oxides (carbon dioxide and carbon monoxide). The reforming may be a steam reforming alone or may be conducted using a partial oxidation, either before or concurrent with the steam reforming (e.g., autothermal reforming). Thus the reforming is effected in the presence of steam, and in the case of using partial oxidation, also in the presence of free oxygen. Carbon monoxide contained in the carbon oxides is thereafter converted to carbon dioxide through at least one of water gas shift and selective oxidation. As the reforming reaction is endothermic and occurs at elevated temperatures, fuel is at least partially combusted with oxygen-containing gas to produce heat for reforming. The combustion may be substantially complete combustion where heat is indirectly provided to a zone in which reforming occurs and/or may be a partial combustion of fuel within a zone in which the reforming occurs. In the former case, the fuel may be the same or different than the fuel that is reformed.

In hydrogen generators, the rate of change in hydrogen production output that is achievable is affected by a transition rate-limiting operation. In accordance with this additional aspect of the invention, the improvement comprises controlling the rate of change of the feed rate of each of the externally-provided raw materials in accordance with a predetermined rate commensurate with the rate of change in the transition rate-limiting operation during the change in the hydrogen production rate.

Advantageously the hydrogen generator is integrated with a fuel cell. The hydrogen generator/fuel cell system is preferably operated within a range of electricity production rates by introducing the externally provided raw materials at effective feed rates into the hydrogen generator in accordance with a predetermined rate based upon the electricity production rate of the system. Thus, the requested hydrogen production output demand for the hydrogen generator is indirectly established by the electric power demand. As the fuel cell efficiency changes, typically fuel cell control systems reflect such changes by requesting more hydrogen to be supplied for a given electric power output.

In a further aspect of the invention pertaining to transition operations, the mole ratios of feed rates of one or more externally provided raw materials to fuel for reforming during at least a portion of a transition period in which the hydrogen production rate changes from a first rate to a second rate, are different than such ratios at the first hydrogen production rate and at the second hydrogen production rate. By using different ratios during a transition period, slower responding conditions to the change can be accommodated and adverse transient responses, such as spikes in carbon monoxide break though, can be attenuated.

In more preferred embodiments of this aspect of the invention, these ratios are controlled during the transition period to avoid undue break though of carbon monoxide in the hydrogen product. In a process wherein fuel is reformed in the presence of steam to produce a reformate, the reformate is subjected to water gas shift and preferential oxidation in the presence of free oxygen to reduce carbon monoxide concentration in the reformate, the ratio of water to fuel for reforming and the ratio of free oxygen for the preferential oxidation to fuel for reforming are changed for at least a portion of the transition period. When the hydrogen production rate is being increased, higher ratios of water to fuel and free oxygen to fuel are used. When the hydrogen production rate is being decreased, lower ratios of water to fuel and free oxygen to fuel are used.

As used herein, the term “transition period” means the duration between the start of a transition from a first hydrogen production rate to the point where steady state operation is achieved at the second hydrogen production rate. The second hydrogen production rate may be achieved prior to steady state operation being achieved at the second hydrogen production rate. The term “water” as used herein connotes liquid water or steam as appropriate under the conditions.

DETAILED DESCRIPTION OF THE INVENTION

Overview of Hydrogen Generators

Figure 1:
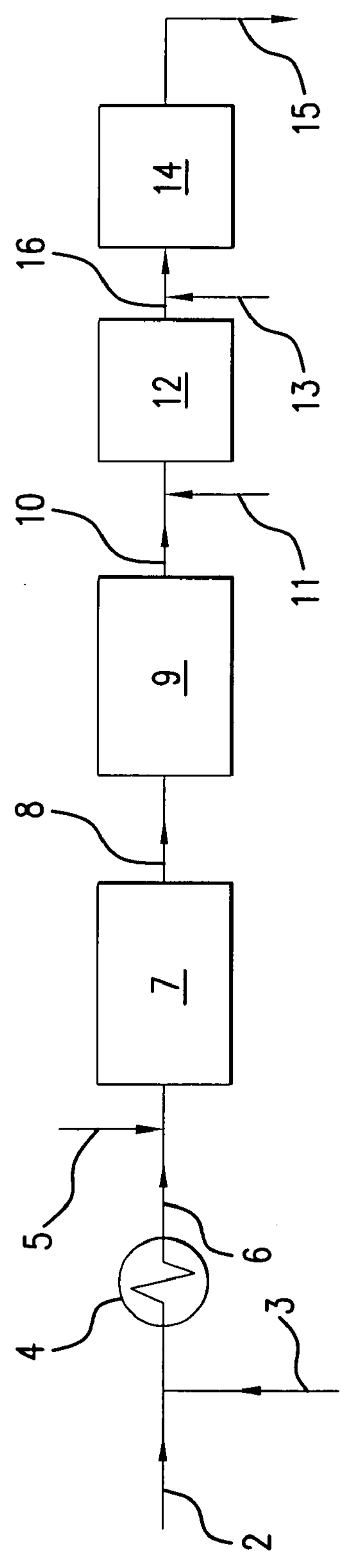
FIG. 1 is a block diagram of an apparatus capable of practicing the process of the invention wherein the ratio of at least one externally provided raw material to fuel for reforming is altered during the transition between different hydrogen production rates.

In the processes of this invention a fuel (hydrocarbon-containing feed) is subjected to a chemical reaction, reforming, to produce hydrogen. Reforming is typically an endothermic, catalytic reaction conducted at elevated temperatures. The generation of hydrogen, for instance, for feed to a fuel cell will also involve the conversion of carbon monoxide produced in the reforming reaction to carbon dioxide. The conversion may be a water gas shift reaction whereby water and carbon monoxide are reacted to produce additional hydrogen and carbon dioxide. Another carbon monoxide conversion process is a preferential, or selective, oxidation reaction through which selectively carbon monoxide is oxidized in the presence of free oxygen to carbon dioxide. As is known in the art, the hydrogen generation process may include various operations for treating the fuel, such as desulfurization, and for preparing the hydrogen product for use in a fuel cell such as dew point control. Also, in some instances, it may be desired to remove carbon dioxide or other inerts in the hydrogen stream.

A fuel cell uses the hydrogen and oxygen-containing gas to generate electricity. The fuel cell also produces an anode waste gas depleted in hydrogen and a cathode waste gas depleted in oxygen. These streams may still contain sufficient heat and hydrogen and oxygen to be of value in an integrated hydrogen generator/fuel cell system.

In further detail, the fuel for the generation of hydrogen is a hydrogen and carbon containing material such as natural gas, liquefied petroleum gas (LPG), butanes, gasoline, oxygenates (e.g., methanol, ethanol, and dimethyl ether), biogas, kerosene or naphtha (a gasoline boiling range material). The invention is particularly useful with natural gas or LPG. Natural gas, LPG and similar hydrocarbons, also generally contain impurities (including odorants) such as sulfur in the form of hydrogen sulfide, mercaptans, organosulfides, and the like which are typically removed. Where fuel is combusted to provide indirect heat exchange to the reformer, the fuel may be the same or different than the fuel used as the feed for reforming.

As to the other externally-provided raw materials, the water preferably is deionized. The source of the oxygen-containing raw material may be pure oxygen, oxygen-enriched air, or most conveniently, air. When enriched, the air frequently contains at least about 25, often at least about 30, volume percent oxygen.

Hydrogen generating processes are known and may use a variety of unit operations and types of unit operations. For instance, the feed components to the reformer are typically admixed prior to being passed to the reformer. The combined feed, or components of the feed, can be heated prior to entry into the hydrogen generator or within the hydrogen generator. In some instances it may be desired to heat the fuel prior to admixing with steam and oxygen, especially if the fuel is a liquid under normal conditions to vaporize it.

The reforming may be via steam reforming or may be effected by a combination of partial oxidation of the fuel being passed to the reformer and steam reforming. Steam reforming is a catalytic reaction producing hydrogen and carbon oxides (carbon dioxide and carbon monoxide) conducted under steam reforming conditions. Steam reforming conditions usually comprise temperatures in excess of 600° C., e.g., 600° C. to 1000° C., and pressures of from about 1 to 25 bar absolute.

Partial oxidation reforming conditions typically comprise a temperature of from about 600° C. to about 1000° C., preferably about 600° C. to 800° C. and a pressure of from about 1 to about 25 bar absolute. The partial oxidation reforming is catalytic. The overall partial oxidation and steam reforming reactions for methane are expressed by the formulae:

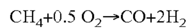

$$CH_4+0.5\ O_2 \rightarrow CO+2H_2$$

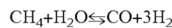

$$CH_4+H_2O \leftrightarrows CO+3H_2$$

The reformer may comprise two discrete sections, e.g., a first contact layer of oxidation catalyst followed by a second layer of steam reforming catalyst, or may be bifunctional, i.e., oxidation catalyst and steam reforming catalyst are intermixed in a single catalyst bed or are placed on a common support. The partial oxidation reformate comprises hydrogen, nitrogen (if air is used as the source of oxygen), carbon oxides (carbon monoxide and carbon dioxide), steam and some unconverted hydrocarbons.

The reformate, reforming effluent, is a gas and is subjected to treatment to remove carbon monoxide. Advantageously, the carbon monoxide is reduced to a concentration of less than about 100 parts per million by volume. The carbon monoxide removal can be by one or more of water gas shift and selective oxidation.

When treatment comprises a water gas shift, typically, the reformate is passed to the shift reactor which contains at least one water gas shift reaction zone. The reformate is typically at temperatures in excess of about 600° C. as it exits the reformer. The reformate is cooled prior to being passed to the shift reactor to water gas shift conditions. In the shift reactor carbon monoxide is exothermically reacted in the presence of a shift catalyst in the presence of an excess amount of water to produce additional amounts of carbon dioxide and hydrogen. The shift reaction is an equilibrium reaction. The reformate thus has a reduced carbon monoxide content.

Although any number of water gas shift reaction zones may be employed to reduce the carbon monoxide level in the hydrogen product, two water gas shift catalyst stages are often used. The first shift catalyst stage is for a high temperature shift at high temperature shift conditions comprising temperatures between about 320° C. and about 450° C. The effluent from the high temperature shift stage is fed to a low temperature shift stage operating at low temperature shift conditions. The effluent from the high temperature shift stage is cooled to temperatures suitable for the low temperature shift. The low temperature shift conditions usually comprise a temperature between about 180° C. and about 300° C.

The water gas shift effluent stream or hydrogen product typically comprises less than about 1, preferably less than about 0.5, mol-% carbon monoxide (on a dry basis). The effluent may be further treated in a suitable manner to remove further carbon monoxide (such as by selective oxidation of carbon monoxide to carbon dioxide) and excess water (as the amount of water required for the cooling of the reforming unit effluent exceeds that required for the shift reaction and for providing a wet gas).

If it is required to reduce the CO concentration to very low levels, such as less than 100 ppm mol, preferably less than 50 ppm mol, or less than 10 ppm mol, a preferential oxidation step may follow the water gas shift step. Alternatively, the hydrogen-containing stream may be further treated, e.g., by absorption, membrane separation or thermal or pressure swing adsorption, to increase hydrogen product purity. The treatment may, for instance, remove carbon dioxide, additional amounts of carbon monoxide, or other diluents in the hydrogen product stream.

The Process

The processes of this invention particularly relate to hydrogen generators and integrated hydrogen generators and fuel cells where the hydrogen production rate is variable, e.g., over a range ("turndown range") of at least about 2, preferably at least about 3 or 4, and most preferably at least about 5. As can be readily appreciated, the wide range of hydrogen production rates contemplated for a given hydrogen generator will entail substantial changes in heat and mass transfer characteristics within the apparatus. These changes need to be accommodated through adjustment of the operating variables, especially where the hydrogen generator or integrated hydrogen generator/fuel cell system takes advantage of process integration, such as heat recovery from process streams.

Aspects of this invention pertain to changing the operation of a hydrogen generator from a first hydrogen production rate to a second hydrogen production rate. The transition between hydrogen production rates advantageously occurs without unduly adversely affecting the efficiency of the generator, without undue content of carbon monoxide in the hydrogen product, and rapidly to minimize the amount of electricity storage required to accommodate transitions in electric power demand. Advantageously, any change in hydrogen production rates (increase or decrease) within, for instance, a turndown or turn-up ratio of 5:1, occurs within 0.5, or even as little as 0.1, hour. Most desirably, the transition occurs in less than 0.1 hour, preferably less than about 0.01 hour.

In accordance with the processes of the aspect of this invention using a feed forward control method, the rates of flow of each of the externally-provided raw materials to the hydrogen generator are controlled to a predetermined rate determined by the sought hydrogen production rate of the hydrogen generator. The predetermined flow rates for the raw materials reflect the condition of the hydrogen generator and the fuel. The externally-provided raw materials comprise fuel, oxygen-containing gas and water.

As used herein, the terms "controlling the feed of each of the externally provided raw materials to the hydrogen generator" mean that the raw material to be fed to each operation of the hydrogen generator is controlled. For instance, one raw material stream may be the fuel fed to the reformer, say, a steam reformer, and another would be the fuel fed to a combustion chamber to heat the reformer, despite the fact that the fuel is ultimately obtained from the same source. Similarly, for a reforming system using a partial oxidation, one raw material stream may be the air fed to the partial oxidation reformer, another would be the air fed to the selective oxidation and yet a further may be air fed to a combustor. Also by way of example for facilitating understanding, liquid water for vaporizing into steam as a feed to the reformer would be one externally-provided raw material, even though the water is ultimately fed in the form of steam. Another raw material would be water to be combined with reformate prior to being subjected to a water gas shift reaction.

Typically, a hydrogen generator will have internal recovery or recycle of materials, e.g., steam, which can be used to supplement the externally provided raw material, e.g., water. The control processes of this invention set the rate of the externally provided raw material introduction, e.g., water, to reflect the anticipated amount of the internally recovered raw material. The control of the rates of introduction of these externally-provided raw materials can be by any suitable means including, but not limited to, control of compressors, pumps, and valves.

The predetermined rates can be based upon the desired performance of the hydrogen generator. For instance, the externally-provided raw material feed rates may be selected to provide at various hydrogen production rates and during transitions, substantially constant hydrogen product purity, or substantially isothermal conditions in one or more of the reactors, or carbon monoxide concentrations in the hydrogen product below a defined amount, or a compromise between or among two or more of these objectives. Preferably, the control objective is to maintain substantially complete conversion of the fuel fed to the reformer both at steady state and during transitions. Most preferably the carbon monoxide conversion reactors are operated to provide a hydrogen product having acceptable carbon monoxide concentration for use in a fuel cell. In some instances, the carbon monoxide concentration of the hydrogen product is maintained substantially constant during a transition.

The predetermined values to which the externally-provided raw material flow rates are set will be dependent upon the particular hydrogen generator design and configuration. As one can easily appreciate, the specific predetermined values for a given hydrogen production rate will be influenced by everything from the type of catalyst (including its performance at a given time) used in each reactor to heat losses to the environment to materials of construction of heat exchangers and their fouling to other factors. Hence, the values are generally determined empirically for a given hydrogen generator unit. For example, the hydrogen generator can be operated at various hydrogen production rates within the turndown range at the desired operating conditions. The flow rates of the externally-provided raw materials can be measured at the rates. These measured values for each raw material flow rate can be stored in a data bank, or look-up table, for use for a given hydrogen production rate or transition, or they can be used to construct algorithms or a set of values for each of the externally-provided raw materials. More advanced process control computer programs may be used in developing the algorithms for the control of the flow rates of the externally-provided raw materials.

Not only will the predetermined flow rate for a raw material be dependent upon the specific hydrogen generator design, but it will also change as the operational condition or state of the unit changes. For example, catalysts may deactivate over time, changing the performance of the unit with a given set of raw material feed rate conditions. Also, heat exchangers may become fouled and pumps and compressors mechanically deteriorated. Accordingly, the predetermined rates of the raw materials for a given hydrogen production rate need to be changed from time to time during the duration of operation of the hydrogen generator to reflect its changed operational condition.

In accordance with this aspect of the invention, the operating conditions are used to define the set of predetermined values to be selected for the operation of the hydrogen generator as opposed to being used to set the operation of the hydrogen generator to a target value and then use measured conditions to bring it to steady state operation. Thus, the processes can monitor operating conditions that otherwise would be unacceptable for feedback control of a hydrogen generator such as carbon monoxide concentration in the hydrogen product which is too slow to provide on-line control and use such conditions to establish the data bank for the predetermined values.

Also, the processes of the invention enable the collective evaluation of a plurality of monitored operating conditions to ascertain which of the unit operations is changing. Thus, the raw material feed rates that can best accommodate the change can be determined, and the predetermined rates can then be adjusted so as to maintain a desired efficiency or hydrogen product quality. For instance, if a higher than desired carbon monoxide concentration exists in the hydrogen product, the monitoring of the operating conditions may indicate that the water shift catalyst is deactivating, and instead of increasing the oxygen to the preferential oxidation, a desired solution may be to change the ratio of water to reformate going to the water gas shift reactor. The predetermined values would, in accordance with the invention, be changed to reflect such a solution.

Advantageously, the monitoring of operating conditions is done with respect to predefined acceptable ranges for the condition. Accordingly, the change in the predetermined feed rates of the externally-provided raw materials can occur on a step change basis. Using a step change reduces the frequency that any change to the predetermined values of raw material feed rate need occur as well as simplifies the construction of the bank of predetermined values or the algorithm or routine used for the control of the hydrogen generator.

One convenient method for detecting the condition of the hydrogen generator to determine the set of predetermined feed rates to be used, is to monitor various process conditions in the unit and compare these values with an expected range for that condition. Preferably various process conditions are monitored for purposes of determining whether the control algorithms need to be changed, either by selection of different algorithms or by adjustment. For instance, the temperature of the effluent from an autothermal reformer can be monitored. If, say, the control algorithm anticipates that the temperature should be in the range of 630° to 650 C. and the measured temperature is 680, it is evident that the steam reforming catalyst has become deactivated and less of the endothermic reforming reaction is taking place. The predetermined flow rates of the raw materials, including fuel and oxygen to the reformer, would be adjusted to new values. The same techniques as described above can be used for determining changes to the predetermined values for each of the raw material flows to the hydrogen generator necessitated by the partial deactivation of other catalysts or partially fouled heat exchangers or the like.

Another condition that is used to select the predetermined feed rates is the composition of the raw materials. This is particularly the case where changes can occur in compositions of raw materials. For instance, if natural gas were the fuel and its composition changed say from 5 volume percent inerts to 8 volume percent inerts, its condition would have changed and its feed rate would also have to be changed to provide substantially the same amount of hydrocarbon or heating value to, e.g., the reformer.

These adjustments can be embedded in the control algorithms such as by the use of fuzzy logic, or can be effected by the use of other multi input/multi output control techniques.

A control system may have pre-established banks of predetermined externally-provided raw material flow rates reflecting for each sought hydrogen production rate to reflect the conditions of the hydrogen generator and the conditions of the fuel encountered. Alternatively, the predetermined flow rates may be calculated by the control system using the detected conditions of the hydrogen generator and the fuel. Importantly, the control of the feed rates of the externally-provided raw materials are interrelated so as to maintain the overall functioning of the hydrogen generator as opposed to incremental and localized responses to measured, local operating parameters.

As stated above, the predetermined values for setting the flow rates of the raw materials to the hydrogen generator are established for various hydrogen production rates of the hydrogen generator. The parameters measured for determining the operational state or condition of the hydrogen generator for purposes of selection of the control algorithms will depend upon the particular design of the hydrogen generator including the type of reformer and the type(s) of carbon monoxide conversion unit operations used as well as the heat and process stream integrations employed. These parameters are readily determinable by one skilled in the art. Usually the parameters will comprise process temperatures, such as the reformer temperature and the water gas shift reactor(s) temperature(s).

In some preferred processes in accordance with this aspect of the invention, the measured operating conditions, if they fall within a specified range for the given operation, do not trigger changing the predetermined values for the raw material feed to the hydrogen generator. If one or more measured operating conditions falls outside this specified range, say, into an enveloping broader range, a change in the predetermined values reflecting the change in operating conditions and/or conditions of the hydrogen generator or raw materials, occurs.

For purposes of illustration, the following table illustrates a bank of predetermined values for select raw materials for operating a hydrogen generator at a hydrogen production rate A and B.

Hydrogen Production Rate A

| Operating Condition | | Predetermined Feed Rate | | |
|---|---|---|---|---|
| I | II | $F_1$ | $F_2$ | $W_1$ |
| 610 to 625 | 320 to 340 | 1.0 | 1.0 | 1.0 |
| 610 to 625 | 340 to 360 | 1.0 | 1.1 | 1.1 |
| 625 to 640 | 320 to 340 | 1.1 | 1.0 | 1.1 |
| 625 to 640 | 340 to 360 | 1.1 | 1.1 | 1.2 |

Hydrogen Production Rate B

| Operating Condition | | Predetermined Feed Rate | | |
|---|---|---|---|---|
| I | II | $F_1$ | $F_2$ | $W_1$ |
| 610 to 625 | 320 to 340 | 1.2 | 1.0 | 1.2 |
| 610 to 625 | 340 to 360 | 1.2 | 1.1 | 1.3 |
| 625 to 640 | 320 to 340 | 1.4 | 1.0 | 1.3 |
| 625 to 640 | 340 to 360 | 1.4 | 1.1 | 1.4 |

For purposes of the above tables, operating conditions I and II may be any monitored condition such as reformer effluent temperature, fuel value of the introduced fuel, system pressure, or the like. $F_1$, $F_2$ and $W_1$ are predetermined values at which metering valves are to be set for a first fuel stream, e.g., to the reformer, a second fuel stream, e.g., to a preheater, and a water stream to the reformer. As operating conditions change, the predetermined meter valve settings for purpose of control of the hydrogen generator are changed to those in the appropriate row. The above tables of predetermined feed values are provided solely to assist in the understanding as to how a bank of predetermined conditions can be developed. Any such bank will have to be to be expanded to cover the range of hydrogen production rates as well as the entirely of the externally-provided raw materials and the monitored operating condition affecting the selection of the predetermined conditions.

The hydrogen demand input for the hydrogen generator can be operator determined or ascertained from an apparatus seeking the hydrogen product. The processes of this invention are particularly useful when integrated with a fuel cell. By integrated, it is meant that the hydrogen product is substantially solely produced for use by the fuel cell. Typically fuel cells monitor both the electric demand and the efficiency of the fuel cell. As stated above, fuel cells are prone to deactivation with use due in part to the adverse effects of carbon monoxide. Consequently, for a given electrical power output, the amount of hydrogen required will change. In an integrated hydrogen generator/fuel cell system, the hydrogen demand is conveniently established by the fuel cell, i.e., the electricity demand establishes the hydrogen demand.

In an aspect of the invention, the transition from one hydrogen production rate to another is effected by using a predetermined transition routine for each of the raw material flow rates. The routine will not only control the amount of the change for each flow rate, which will be determined by the absolute values of the hydrogen demand, but also, the rate and timing of the change. The control of the rate and timing of the changes in each of the raw material flow rates during a shift in hydrogen demand is important since not all operations in the hydrogen generator respond at the same rate. For example, the rate of fuel fed to the reformer may be able to be increased quickly, but the time required to generate more steam may be slower. Thus, to maintain a desired steam:fuel ratio in the feed to the reformer, the increase in the fuel feed rate will be predetermined to match the rate of increase in the steam production.

Accordingly, the processes of this aspect of the invention control the rate of change of each of the externally-provided raw materials in accordance with the rate of change of a transition rate-limiting operation. A transition rate-limiting operation means an operation in the unit (which may be a reaction, heat transfer or mass transfer operation) (a) that is required to be changed to achieve a steady state operation of the hydrogen generator at the new hydrogen production rate, and (b) which has a slower transition response of the unit operations to be changed.

The terms "a predetermined rate commensurate with" means that the predetermined change in feed rate of each of the raw materials is made with reference to the rate of change of the transition rate-limiting operation. It is not essential that the rate of change be proportional to and timed with the rate that this rate-limiting operation is changed. Indeed, it is contemplated that the feed rates of some raw materials may change independent of the rate of change of the rate-limiting operation, but such change will be reflected in the predetermined changes in rates. For example, when a steam reformer is used and the hydrogen production rate is to be increased, the rate that the fuel and oxygen-containing gas are fed to a burner for heating the reformer, are typically changed as quickly as possible, regardless of the rate that the rate-limiting operation will change.

Sometimes a feed rate change during a transition will be effected to compensate for a slower transition rate operation. By way of example, during an increase in hydrogen production rate, often the concentration of carbon monoxide temporarily increases. Hence in an aspect of this invention, the feed rate of the oxygen-containing raw material to the preferential oxidation reactor is at a level above expected at steady state in order to increase the amount of carbon monoxide oxidized. Similarly, where a process stream is used to cool the effluent from the reformer, an ancillary heat transfer means such as water injection into the effluent may be used and the rate of water injection controlled in accordance with a predetermined routine to compensate during the transition to the new hydrogen production rate.

Also in another aspect of the invention, certain feed rates of raw materials are maintained in predetermined ratios varying with the hydrogen production rates during the transition. In illustration, where the hydrogen generator uses an autothermal reformer, the fuel to oxygen-containing raw material ratio to the reformer may proceed in accordance with the algorithm $$R=(k*b*F)/(1+bF)$$

wherein R is the fuel ratio defined as F/(F+A), F is the molar fuel flow, A is the molar oxygen-containing gas flow, and k and b are empirical constants. The same algorithm can set forth the predetermined flows of these raw materials at steady state conditions at various hydrogen production rates. Similarly, if water is injected into the feed to the autothermal reactor, the algorithm can be further refined to reflect the heat required for vaporization and sensible heating of the water.

The transition rate-limiting operation will be dependent upon the type and configuration of the hydrogen generator, and the transition rate-limiting operation may be different when the hydrogen production rate is increased than when the hydrogen production rate is decreased. In some instances, the transition rate-limiting operation may be different at one hydrogen production rate than at another rate.

In the aspects of this invention where ratios of at least one externally provided raw material to fuel are changed during a transition period, the effect of transition rate-limiting conditions can be attenuated and desirable hydrogen product quality maintained. A particularly important benefit of this aspect of the invention pertains to the efficacy of the carbon monoxide reduction through a preferential or selective oxidation. The preferential oxidation reaction has the purpose of oxidizing the carbon monoxide to produce carbon dioxide, while a small fraction of the product hydrogen is oxidized to produce water. The low carbon monoxide levels that are desired for use with PEM fuel cells are readily achieved with the prior art processes when operating under steady state operating conditions. However, application of PEM fuel cells to residential power generation, or other applications that provide for intermittent operation, requires the provision of a fuel processor that can maintain low carbon monoxide levels under transient operating conditions. In particular, it has been found that periods of high carbon monoxide concentration can occur, generally during periods of increase in throughput of fuel (turn-up).

Depending upon such factors as reformate flow rate, steam to carbon oxides ratio, and the nature of the shift catalyst and the shift temperature, the carbon monoxide content of the gas exiting the shift reactor can be as low as 0.2 mol-% (dry basis). Hence, shift reactor effluent comprises a bulk mixture of hydrogen, nitrogen, carbon dioxide, water, carbon monoxide, and residual hydrocarbon.

The shift reaction is typically not enough to sufficiently reduce the carbon monoxide content of the reformate to the necessary level—i.e. below about 100 parts per million volume (ppmv) and preferably below 10 ppmv. Therefore, it is necessary to further remove carbon monoxide from the hydrogen-rich reformate stream exiting the shift reactor, prior to supplying it to the fuel cell. It is known to further reduce the carbon monoxide content of hydrogen-rich reformate exiting a shift reactor by a so-called preferential oxidation reaction effected in a suitable preferential oxidation reactor. A preferential oxidation reactor usually comprises a catalyst bed, which promotes the preferential oxidation of carbon monoxide to carbon dioxide by air in the presence of the diatomic hydrogen, but without oxidizing substantial quantities of the hydrogen itself. Desirably, the oxygen required for the preferential oxidation reaction will be no more than about two to four times the stoichiometric amount required to react the carbon monoxide in the reformate. If the amount of oxygen exceeds about two to four times the stoichiometric amount needed, excessive consumption of hydrogen results. On the other hand, if the amount of oxygen is substantially less than about two to four times the stoichiometric amount needed, insufficient carbon monoxide oxidation will occur.

Preferential oxidation reactors may be either (1) adiabatic (i.e. where the temperature of the reformate (syngas) and the catalyst are allowed to rise during oxidation of the carbon monoxide), or (2) approximately isothermal (i.e. where the temperature of the reformate (syngas) and the catalyst are maintained substantially constant by heat removal from the reactor during oxidation of the carbon monoxide). The adiabatic preferential oxidation process may be effected via one or more stages with inter-stage cooling, which progressively reduce the carbon monoxide content. Temperature control is important, because if the temperature rises too much, methanation, hydrogen oxidation, or a reverse shift reaction can occur. This reverse shift reaction produces more of the undesirable carbon monoxide, while methanation and excessive hydrogen oxidation negatively impact system efficiencies and can lead to large temperature excursions and reactor instability.

The processes that have been previously developed have provided satisfactory results in reduction of the carbon monoxide level below the desired level when operating in a steady state mode. However, it is also necessary to maintain this low level of carbon monoxide concentration at all times during operation of the fuel processor in order to avoid poisoning of the PEM catalyst. In particular, previous to the present invention, considerable difficulty has been found with a rise in carbon monoxide levels during turn-up of the fuel processor. During rapid turn up, this proves to be even more of a problem. One reason for the difficulty in maintaining a low level of carbon monoxide is that the water gas shift reactor takes time to reach the appropriate operating temperature, and there is generally a time lag associated with steam production in the system.

In one embodiment, the fuel and steam are passed to a convection heated pre-reforming zone at a pre-reforming temperature to produce a pre-reforming effluent. The pre-reforming effluent and a first air stream are passed to a partial oxidation zone in a reaction chamber to produce a partial oxidation effluent. A controlled ratio of water to fuel is added into the fuel and steam. The partial oxidation effluent is passed to a reforming zone disposed in the reaction chamber to produce a reforming effluent comprising predominantly hydrogen, nitrogen, carbon dioxide and carbon monoxide. The reforming effluent is passed to a carbon monoxide reduction zone to produce a hydrogen product. The carbon monoxide reduction zone comprises a water gas shift zone and at least one preferential oxidation reactor. A controlled ratio of air to fuel is added to the hydrogen product prior to its entrance into the preferential oxidization reactor. The hydrogen product is passed to a fuel cell zone to produce electric power.

In another embodiment of this aspect of the invention, the water to fuel ratio and free oxygen to fuel ratio are adjusted in accordance with a predetermined algorithm. Water is added to the fuel prior to said fuel entering the reformer, and free oxygen (air) is added to said at least one preferential oxidation reactor in accordance with an algorithm. In one possibility, the algorithm may be used in conjunction with determining whether the hydrogen production rate is increasing or decreasing. In such an instance, the algorithm comprises determining a target hydrocarbon fuel flow (B) and a current hydrocarbon fuel flow (A), then determining a present difference (D)=(B)−(A), and then comparing said difference (D) with a predetermined value to determine whether the hydrogen generator is turning up production of hydrogen, turning down production of hydrogen or operating at a steady state mode. A higher ratio of water to fuel and free oxygen to fuel is added when the hydrogen generator is turning up production for a preset period of time than when the hydrogen generator is operating at a steady state mode. A lower ratio of water to fuel and free oxygen to fuel is added when the hydrogen generator is in a turning down of production.

In another embodiment of this aspect of the invention, the hydrogen produced is used in a fuel cell system for electric power generation. The process comprises a series of integrated steps. The fuel is passed to a preparation module to produce a conditioned feedstock. The conditioned feedstock is passed to a pre-reforming zone containing a pre-reforming catalyst. The pre-reforming zone is in intimate thermal contact with a first heat exchange zone having a steady-state temperature profile to produce a pre-reforming effluent stream comprising hydrogen, nitrogen, carbon monoxide, carbon dioxide and water. Additional water in amounts calculated in accordance with the algorithm used in the practice of this aspect of the invention is injected into the pre-reforming effluent stream. The pre-reforming effluent stream at effective partial oxidation conditions is passed to a partial oxidation zone containing a partial oxidation catalyst. In the partial oxidation zone the pre-reforming effluent is contacted with a first free oxygen (air) stream to produce a partial oxidation effluent stream. The partial oxidation effluent stream at effective reforming conditions is passed to a reforming zone. The reforming zone contains a reforming catalyst to produce a reforming effluent stream. The reforming effluent stream, or reformate, is withdrawn from the reforming zone at a reforming exit temperature. The reformate and a first water stream are passed to a water gas shift reaction zone containing at least one water gas shift catalyst zone. The water gas shift reaction zone is in intimate thermal contact with a second heat transfer zone having a steady-state temperature profile to cool the water gas shift reaction zone by indirect heat transfer to effective water gas shift conditions to produce a hydrogen product stream comprising hydrogen, nitrogen, carbon monoxide, carbon dioxide and water. The hydrogen product stream is passed to an anode side of a fuel cell zone. The fuel cell zone has a cathode side on which an oxygen containing stream is contacted to produce electric power and an anode waste gas comprising hydrogen is withdrawn from the anode side. The anode waste gas is returned to a burner zone wherein the anode waste gas is contacted with a sufficient amount of a second air stream to combust the anode waste gas to produce a flue gas stream at a flue gas temperature. The flue gas stream is passed to the first heat exchange zone to heat the pre-reforming zone to the effective pre-reforming conditions.

One embodiment of this aspect of the invention is the algorithm for control of the ratio of the free oxygen for preferential oxidation (air):fuel ratio and the water injection:fuel ratio. In general, these ratios are highest when the throughput of fuel is increasing, less during steady state operation and even lower during a turn-down of the operation. As stated above, in determining the appropriate ratio to employ, a flow target is determined for the particular apparatus and then the present feed flow is measured. The difference in these two numbers is determined. When the number is greater than a predetermined value, then a greater volume of air is added to the preferential oxidation reactors and a greater amount of water is injected into the feed line. When the flow target is reached, a timer is initiated (i.e., the start of the transition period) and the free oxygen:fuel and water:fuel ratios are maintained at their respective predetermined values until the timer expires (end of the transition period) or until another flow target is requested. When the timer expires, the respective ratios are set to their steady state values. These ratios during the transition period may be set at one or more steps or may be continuously varied during the transition period.

In some aspects, the free oxygen:fuel and the water injection:fuel ratios become twice as high during turn-up as during turn-down. The steady state ratio is about 25% higher than the lowest turn-down ratios. All ratios are calculated as molar ratios.

The following Table 1 illustrates sample ratios for the free oxygen (air):fuel and water:fuel for natural gas fuel. These molar ratios may be determined by experimentation. These ratios are specific to natural gas feed and would be higher for heavier fuels, such as LPG.

TABLE 1

| | Turn-up Ratio of Air:Feed and Water:Feed | Turn-down Ratio of Air:Feed and Water:Feed | Steady State Ratio of Air:Feed and Water:Feed |
|---|---|---|---|
| Air:Feed for each preferential oxidation stage | 0.14 | 0.07 | 0.10 |
| Water:Feed | 1.00 | 0.20 | 0.40 |

DETAILED DESCRIPTION OF THE DRAWINGS

The invention will be further described with reference to the drawings which description is not intended to be in limitation thereof.

Referring to FIG. 1, which illustrates a simplified schematic of a hydrogen fuel processor (hydrogen generator) for use with a fuel cell, a hydrocarbon (e.g., natural gas) and steam feed in a line 2 is passed to a preheat exchanger 4. Water feed in a line 3 for injection of a desired flow of water enters the line 2, prior to entrance into the preheat exchanger, which may incorporate a pre-reforming zone. A pre-reforming effluent stream is withdrawn from the preheat exchanger 4 in a line 6, with addition of a measured quantity of a first air stream 5 to the line 6 which leads to an autothermal reforming (ATR) reactor 7. In the ATR reactor 7, at least a portion of the pre-reforming effluent stream is converted to produce an ATR reactor effluent stream comprising hydrogen, nitrogen, carbon monoxide, carbon dioxide and water. The ATR reactor effluent stream is withdrawn from the ATR reactor 7 and passed through a line 8 to a water gas shift reactor 9. The water gas shift reactor 9 contains at least one water gas shift catalyst zone and provides for the conversion of carbon monoxide to carbon dioxide to produce a hydrogen product stream having a low level of carbon monoxide. The hydrogen product stream is withdrawn from the water gas shift reactor 9 in a line 10. If the fuel cell is of a type that is sensitive to carbon monoxide, the concentration of carbon monoxide needs to be further reduced.

Selective oxidation techniques (also known as preferential oxidation) are preferred for the further reduction in level of carbon monoxide. For example, reduction of the carbon monoxide concentration to a level of less than 10 ppmv is required for PEM-type fuel cells, while phosphoric acid fuel cells have a higher carbon monoxide tolerance. As shown in FIG. 1, the hydrogen product stream passes through the line 10 into at least one preferential oxidation reactor 12. In some embodiments of the invention, a second preferential oxidation reactor, 14, as illustrated herein, is provided with the hydrogen product stream passing through a line 16. A measured flow of air is added to the hydrogen product stream through a line 11 and through a line 13 when the second preferential oxidation reactor 14 is present. In general, the volume of air is split equally between the two preferential oxidation reactors.

The hydrogen product stream leaves the preferential oxidation reactor 12 or preferential oxidation reactor 14 when two units are used and is passed to an anode side of a fuel cell through a line 15, while an oxygen containing stream such as air is passed to a cathode side of the fuel cell and an anode waste stream which is now depleted in hydrogen relative to the hydrogen product stream is withdrawn from the fuel cell.

Figure 2:
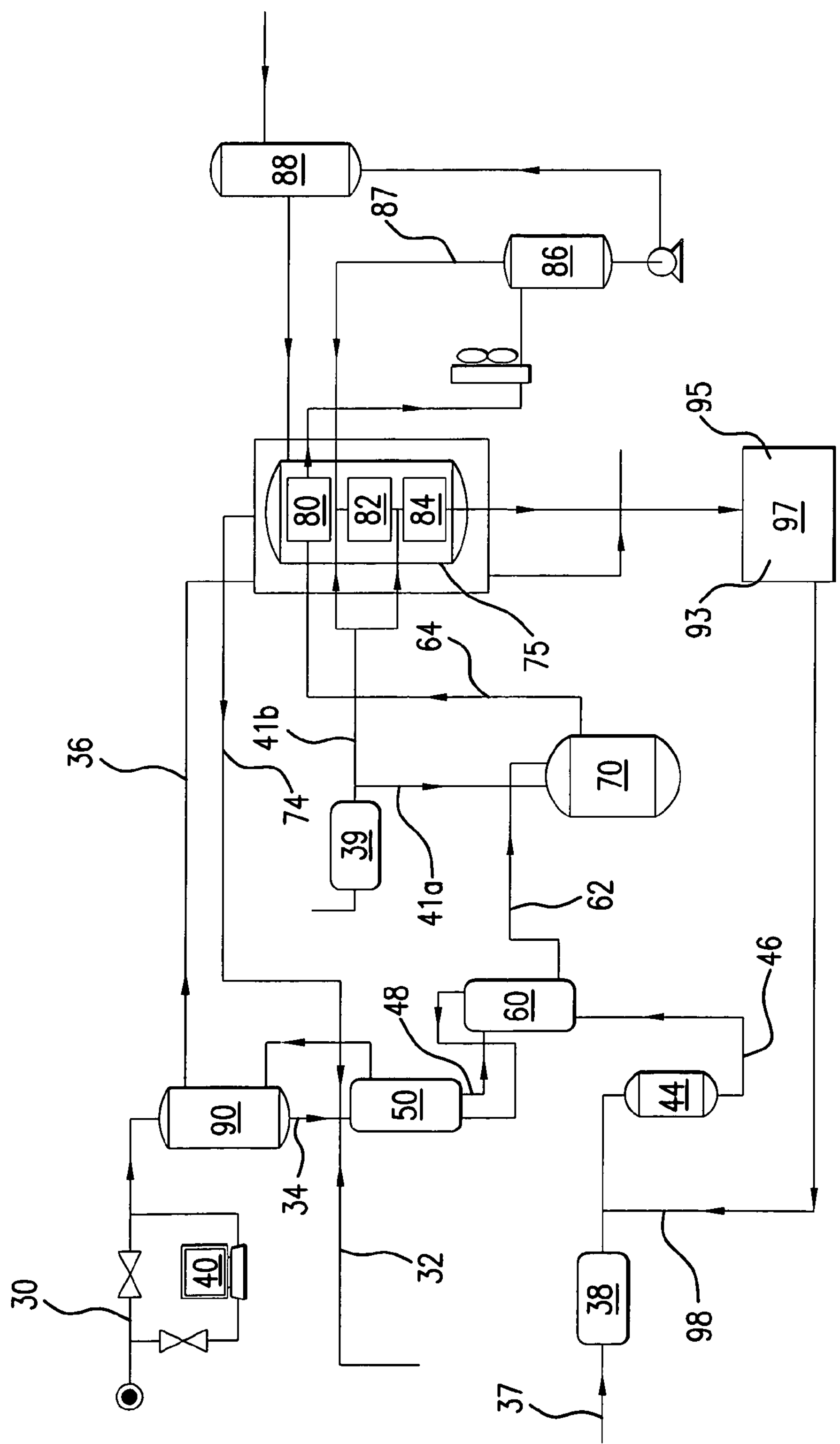
FIG. 2 is a diagram illustrating the process of the present invention including pre and post processing steps with respect to the apparatus of FIG. 1.

FIG. 2 represents a system for conversion of a hydrocarbon feedstock such as a natural gas stream in a line 30 to electric power using a fuel cell 97. Referring to FIG. 2, a natural gas stream in the line 30 is passed to a treater 90 comprising a desulfurization zone or zone for removal of other impurities. The desulfurization zone contains a sorbent for the removal of impurities such as sulfur compounds including hydrogen sulfide and mercaptans. The desulfurization sorbent is selected from the group consisting of zeolites, activated carbon, activated alumina, zinc oxide, mixtures thereof or other materials known to those skilled in the art as useful in removal of impurities from natural gas. A processed natural gas stream is removed from the treater zone in a line 34. Water can be added to the stream through a line 32, as necessary. A natural gas compressor 40 is shown for maintaining the flow of gas feed to the system. The treated gas feed goes through line 34. Steam from the boiler 75 passes through a steam line 74 to be combined with the treated gas feed in the line 34. An additional amount of water can be injected into the line 34. The amount of water injected into the system is calculated in accordance with the present invention and is dependent upon the stage of operation of the fuel processor. The feed in the line 34 that now contains a mixture of treated gas feed, steam and injected water now proceeds to a vaporizer 50 to produce steam from the injected water. The vaporizer 50 comprises a plate-type heat exchanger.

From the vaporizer 50, the gas feed/steam mixture passes through a line 48 to a pre-reformer 60. The pre-reformer zone contains a pre-reforming catalyst selected from the group consisting of nickel on alumina and the like. The pre-reformer 60 is in intimate thermal contact with a heat exchange zone which supplies heat by indirect heat exchange in the convection temperature range to heat the pre-reformer 60. A pre-reforming effluent stream is withdrawn from the pre-reformer 60 in a line 62. A first air stream 37 passes through a blower 38 and is added to an anode waste gas stream 98 and then is heated in a burner 44. In other embodiments of the present invention, the anode waste gas stream 98 may be replaced with a portion of the gas that passes through the treater 90. This produces a heated flue gas stream 46 that provides the heat to the heat exchange zone in intimate contact with the pre-reformer 60.

From the pre-reformer 60, the pre-reforming effluent stream passes through the line 62 to a combined partial oxidation reactor/reformer, also known as an autothermal reformer (ATR) reactor 70. The pre-reforming effluent stream is passed to a partial oxidation zone at effective partial oxidation conditions including a partial oxidation temperature between about 550° and about 900° C. (932° and 1652° F.) and a partial oxidation pressure between about 100 to about 350 kPa (15 to about 50 psi). Either simultaneously with the introduction of the pre-reforming effluent or as a partial oxidation feed admixture combined with the pre-reforming effluent stream, an air stream in a line 41_a_ is introduced to the ATR reactor 70. A blower 39 is used to create the air stream in the line 41_a_. The partial oxidation zone within the ATR reactor contains a partial oxidation catalyst. In the partial oxidation zone, at least a portion of the pre-reforming effluent stream is converted to produce a partial oxidation effluent stream comprising hydrogen, nitrogen, carbon monoxide, carbon dioxide, water and unreacted hydrocarbon. The partial oxidation effluent is passed to a reforming zone within the ATR reactor 70. The reforming zone contains a reforming catalyst. In the reforming zone, the partial oxidation effluent stream undergoes a further conversion to produce a reforming effluent stream comprising hydrogen, nitrogen, carbon monoxide, carbon dioxide and water. The partial oxidation zone and the main reforming zone are combined into a single combined reaction zone comprising the ATR reactor 70.

The reforming effluent stream now goes through a line 64 to a water gas shift reactor 80 which contains at least one water gas shift catalyst zone and provides for the reduction in concentration of carbon monoxide to produce a hydrogen product stream. The hydrogen product stream is withdrawn from the water gas shift reactor 80 to then be treated in one or more preferential oxidation reactors 82, 84. The water gas shift reaction is a mildly exothermic reversible reaction and must be cooled to maintain a suitable reaction temperature. The water gas shift reactor 80 is cooled by indirect heat exchange with a second heat exchange zone, shown herein as the boiler 75. As practiced in the preferred embodiment of the present invention, the boiler 75 produces the steam that goes through the line 74 and enters the line 34 as described above to be admixed with the hydrocarbon feed and the additional water injected into the system.

As shown in FIG. 2, the hydrogen product stream passes through a line 87 to a knock-out pot 86 where the hydrogen product stream is cooled by room temperature air or another cooling means in order to condense and remove water. The water may be recycled to a water reservoir 88 and returned to the boiler 75 or the water may be discarded. The hydrogen product stream is then sent to the line 87 to a preferential oxidation reactor zone shown herein as the preferential oxidation reactors 82, 84. A second air stream 41_b_ is added to the preferential oxidation reactors 82, 84. Equal volumes of air may be sent to each preferential oxidation reactor or different amounts as calculated appropriate for maximum reduction of carbon monoxide level. The amount of air added to the preferential oxidation reactors 82, 84 is calculated in accordance with the present invention. The preferential oxidation reactors 82, 84 may be positioned in an annular arrangement in order to maximize surface area in contact with the water within the boiler 75. The preferential oxidation reactors 82, 84 contain a preferential oxidation catalyst to convert virtually all of the remaining carbon monoxide to carbon dioxide.

After being treated in the preferential oxidation reactor, the final hydrogen product stream passes to an anode side 93 of the fuel cell 97 along with an oxygen containing stream (air, not shown) that enters a cathode side 95 of the fuel cell 97 wherein the hydrogen and oxygen react to produce electric current.

Figure 3:
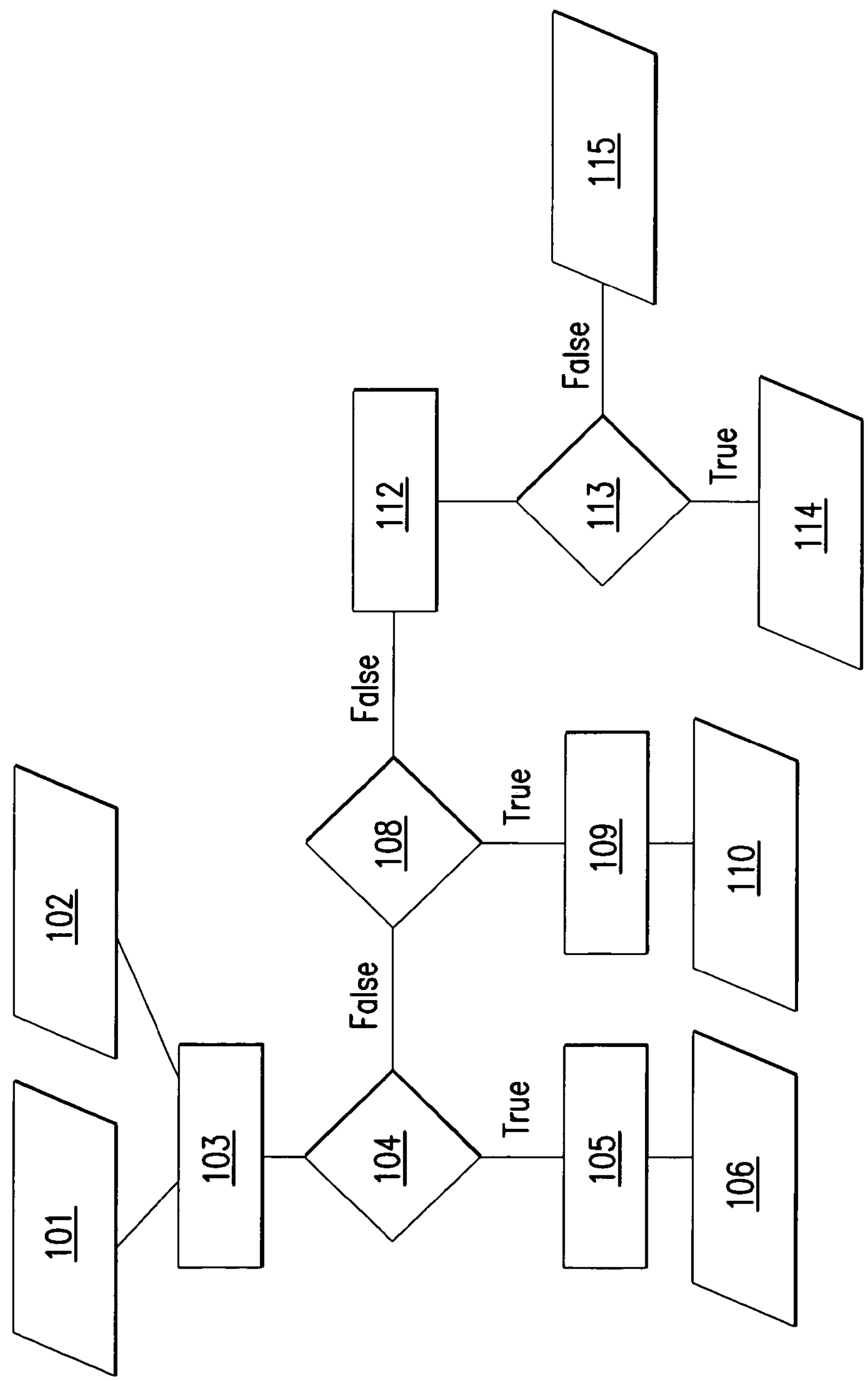
FIG. 3 is a diagram of the algorithm calculations used to determine the ratios of water injection:fuel and free oxygen (air):fuel with respect to the operation of the apparatus of FIG. 1.

In FIG. 3 is illustrated an algorithm for control of the preferential oxidation reactor air:hydrocarbon feed ratio and the water injection:hydrocarbon feed ratio. In a block 101 is shown the hydrocarbon feed flow target set point B which depends upon the hydrogen output desired from the fuel cell or other uses of the hydrogen product. In a block 102 is the current set point for hydrocarbon feed flow A. In a block 103 is the equation D=B−A. In a decision block 104, the difference D is compared with a pre-determined threshold value. If D is greater than zero and D is greater than the threshold value (True), then the fuel processor is considered in a turn-up mode and the algorithm passes to block 105. In block 105, the air:fuel or water:fuel ratio is set to an appropriate value for turn-up (see Table 1). Also in block 105, a timer is reset to zero. Control execution then passes to block 106, where the respective air or water flow set point is output to the controller. Referring again to block 104, if D is less than the threshold value (False), then the algorithm passes to block 108. In the decision block 108, if D is less than zero and the absolute value of D is greater than the threshold value (True), then the fuel processor is considered in a turn-down mode and the algorithm passes to block 109. In block 109, the air:fuel or water:fuel ratio is set to an appropriate value for turn-down (see Table 1). Also in block 109, a timer is reset to zero. Control execution then passes to block 110, where the respective air or water flow set point is output to the controller. Referring again to block 108, if D is greater than the threshold value (False), then the algorithm passes to block 112. In block 112, a timer is initiated and the algorithm passes to block 113. In the decision block 113, if the timer has not expired (True), then the algorithm passes to block 114. In block 114, the air:fuel or water:fuel ratio is maintained at the respective turn-up or turn-down value. When the timer expires in block 113 (False), the algorithm passes to block 115. In block 115, the air:fuel or water:fuel ratio is reset to the respective value for steady state operation (see Table 1).

The control algorithm in FIG. 3 executes in a continuous fashion, thereby providing an appropriate air:fuel or water: fuel ratio for the particular operating mode of the fuel processor (turn-up, turn-down, or steady state). The timer function allows the respective ratios to be maintained at the tun-up or turn-down values for a period of time after the turn-up or turn-down has been completed. It has been found that this delay in resetting the respective ratios to their steady state values after completing a ramp-up is essential for maintaining a low carbon monoxide concentration.

Figure 4:
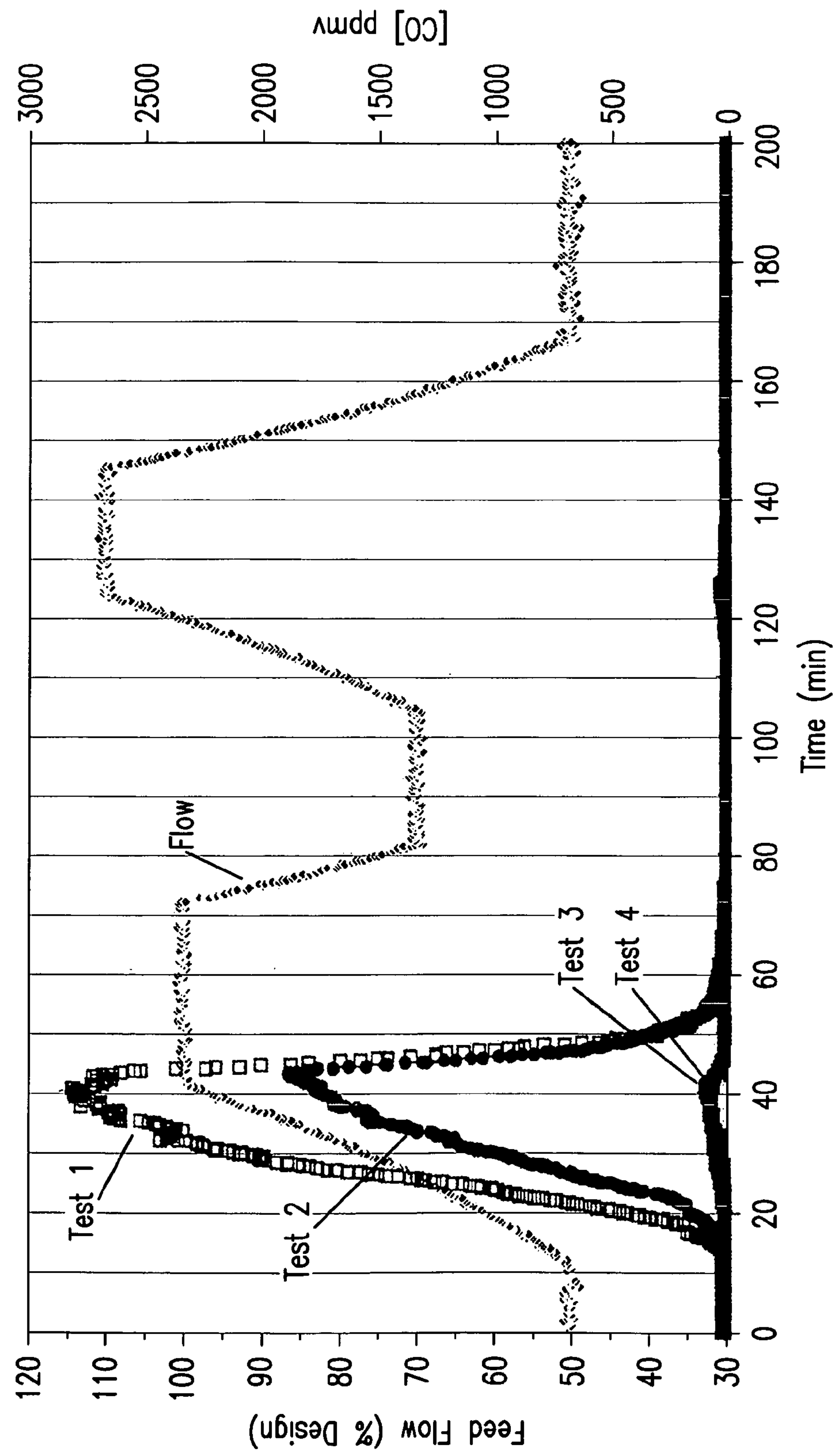
FIG. 4 is a graph showing the effectiveness of the present invention in the control of carbon monoxide levels in the operation of the apparatus of FIG. 1.

In FIG. 4 is shown the effect of the use of the algorithms of the present invention in control of the carbon monoxide level through variations in fuel flow. As shown on the chart, feed flow in percent of design capacity is varied from 50 to 110% with concentration of carbon monoxide shown for four test runs. In Test 1, the control test, where the preferential oxidation reactor air to natural gas fuel ratio was held constant and where there was no water injection, there was a very significant peak shown of carbon monoxide level to above 2500 ppmv. In Test 2, a constant ratio of water to feed and a constant ratio of air to feed was used and there was somewhat less carbon monoxide produced as a result of the water injection, but the level was still much more than acceptable. In Tests 3 and 4, the preferential oxidation air was varied in accordance with the algorithm of the present invention as well as the addition of water. The carbon monoxide spike was greatly reduced in Tests 3 and 4.

A series of tests was performed using an apparatus, essentially as shown in FIG. 2, to test the effectiveness of the algorithm for water injection and preferential oxidation air. The feed flow of natural gas was increased from 50% of design to 100% of design level in 30 minutes. The feed flow was then held constant at 100% for 30 minutes before ramping down to 70% in 10 minutes. After holding at 70% for 20 minutes, the feed flow was increased to 110% over a 20-minute interval. The feed was held at 110% for 20 minutes prior to finally ramping down to 50% in 22 minutes. Ramping of feed flow was performed automatically with an algorithm that keeps the percentage change constant to provide an exponential flow vs. time curve.

Prior to each test, the unit was operated at a 50% flow steady-state condition. Four tests were performed. Test 1 was performed with a constant preferential oxidation air:natural gas feed ratio and no water injection. Tests 2, 3 and 4 all included water injection at a constant water:feed ratio of 1.0. Test 2 used a constant preferential oxidation air:feed ratio, while Tests 3 and 4 included preferential oxidation air at a ratio to feed determined in accordance with the algorithm used in the present invention. The ratio of air:feed was higher on turn-up and reduced on turn-down.

Carbon monoxide concentration in the product stream was continuously monitored with an infrared detector and the results are shown in FIG. 4. There was a large carbon monoxide spike in Test 1 during the initial turn-up of the feed, peaking near the end of the ramping up at 2800 ppmv. In Test 2, the addition of the water injection reduced the initial carbon monoxide spike significantly, but the maximum remained high, at 1900 ppmv. The combination of the water injection and the preferential oxidation air algorithm almost eliminated the initial spike of carbon monoxide—the peak maxima were 90 ppmv and 70 ppmv for Tests 3 and 4, respectively. In order to compare results, the peaks were integrated according to the formula $I=\int(\text{Fuel Flow})\times y_{co}{}^{dt}$ where $y_{co}$ is the carbon monoxide concentration. The integral I is roughly proportional to the amount of carbon monoxide that would be deposited on the fuel-cell anode. Integrated results, normalized with respect to Test 1, are given in the following Table 2. All data for $y_{co}>20$ ppmv were included in the integration.

TABLE 2

| Test No. | I |
|---|---|
| 1 | 1.00 |
| 2 | 0.59 |
| 3 | 0.021 |
| 4 | 0.013 |

Figure 5:
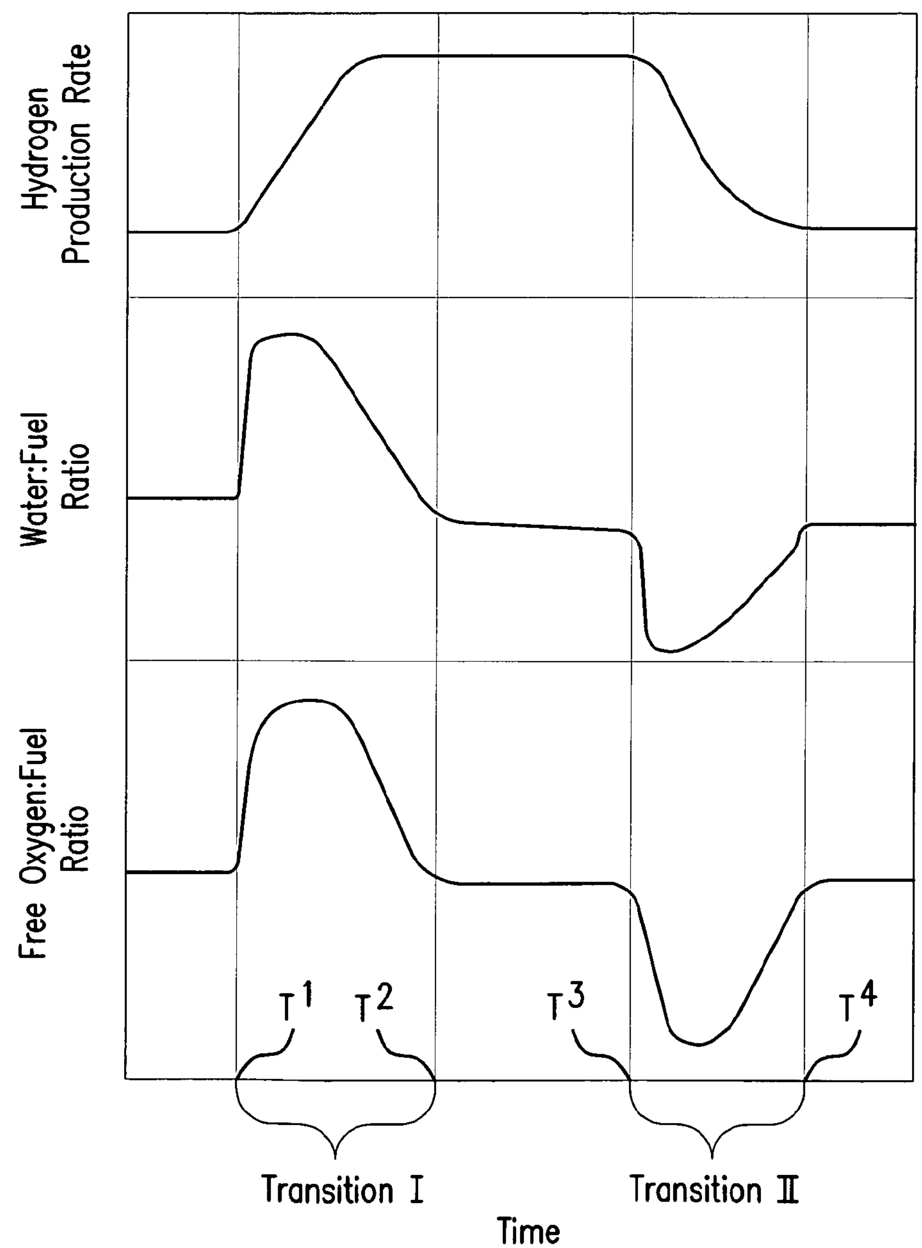
FIG. 5 is an illustrative depiction of the ratios of water:fuel and free oxygen:fuel during a transition period in the operation of the apparatus of FIG. 1.

FIG. 5 is an illustration of control algorithms implemented upon an increase in demand for hydrogen production and for a decrease in demand of hydrogen production. Time $T^1$ is the beginning of the first transition period (I) and $T^2$ is the end of the period. During this period, the hydrogen production increases, and as can be seen, the desired hydrogen production rate is achieved prior to the end of the transition period and before steady state at the new hydrogen production rate is achieved. Similarly, transition period II starts at time $T^3$ and ends at $T^4$, during which time the rate of hydrogen production is decreased. Again, the sought hydrogen production rate is achieved prior to the end of the period and steady state operation being achieved. The free oxygen to fuel and the water to fuel ratios vary over the transition period to accommodate inherent lags in the hydrogen generator to achieve steady state conditions at the new hydrogen production rate.

Figure 6:
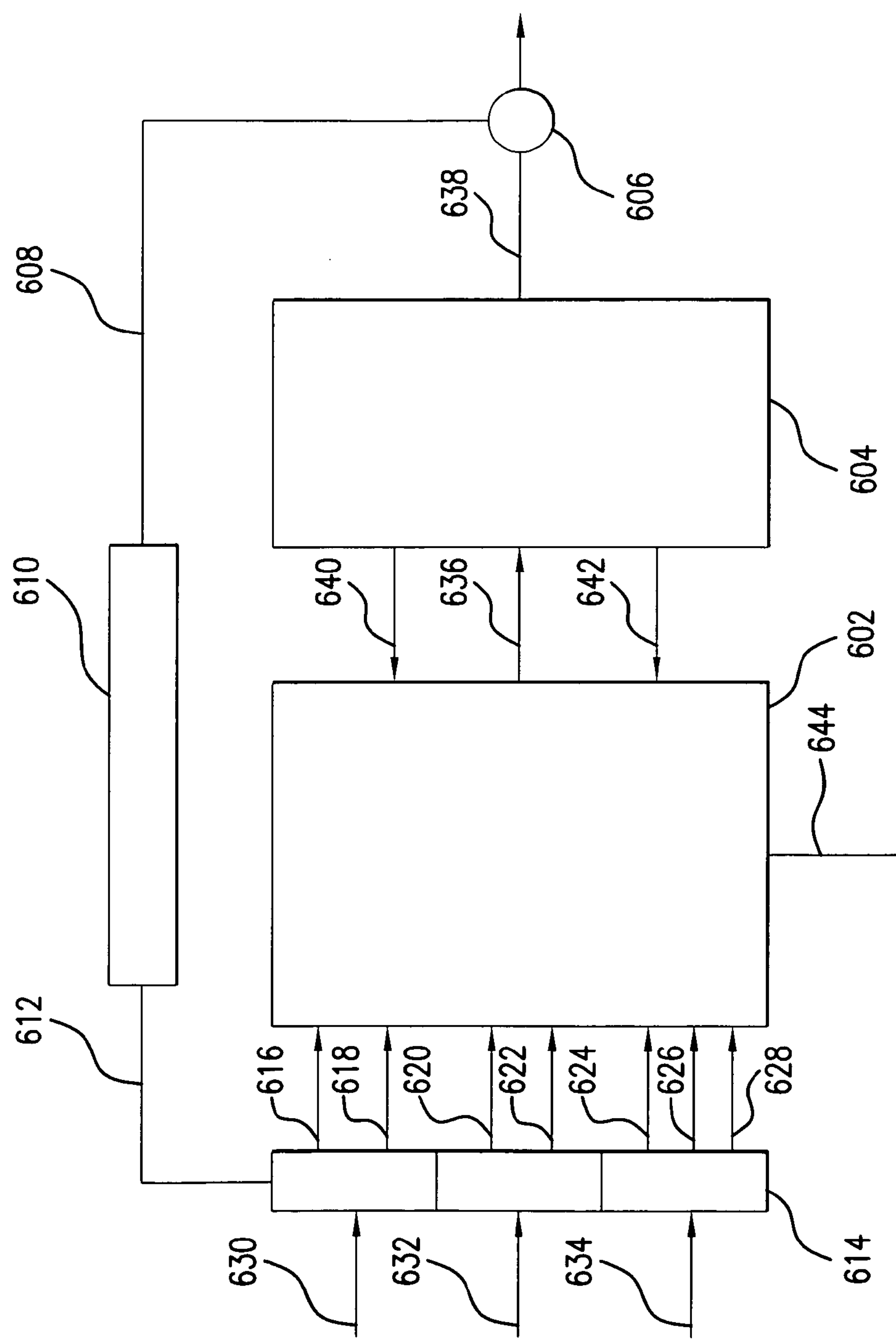
FIG. 6 is a block diagram of an apparatus capable of practicing the processes of this invention.

FIG. 6 is a schematic depiction of an integrated hydrogen generator/fuel cell system. The hydrogen generator is generally depicted by box 602 and the fuel cell by box 604. Sensor 606 determines the electric power demand and the hydrogen feed rate to the fuel cell to produce that amount of power. A hydrogen demand signal generated by sensor 606 is sent via line 608 to computer 610 having therein predetermined feed rates for the raw material to hydrogen generator 602 for its operational condition. Signals are generated by computer 610 for controlling the feed rate of each of the externally-provided raw materials. These control signals are transmitted to the individual controllers. For purposes of ease of reference, line 612 is to generally indicate the lines to each controller. The controllers are generally indicated by block 614. Block 614 contains a controller for each of the raw material streams.

The number of raw material streams will depend upon the particular design of hydrogen generator. As depicted for illustration herein, FIG. 6 shows seven streams (each of which are an externally-provided raw material stream) for a hydrogen generator using an autothermal reformer, a two stage water gas shift reactor and a preferential oxidation reactor as summarized by the following table.

| Number | Stream Identifier | Destination |
|---|---|---|
| 616 | $F_1$ | Fuel to reformer |
| 618 | $F_2$ | Fuel to preheater |
| 620 | $A_1$ | Oxygen-containing gas to reformer |
| 622 | $A_2$ | Oxygen-containing gas to preferential oxidation reactor |
| 624 | $W_1$ | Water to reformer |
| 626 | $W_2$ | Water for injection after reformer |
| 628 | $W_3$ | Water for injection between water gas shift reactor stages |

The supply to the controllers for fuel is via line 630, for oxygen-containing gas via line 632 and for water via line 634.

The hydrogen product from hydrogen generator 602 is passed via line 636 to fuel cell 604 for conversion to electricity transmitted via line 638. Although sensor 606 is shown as being in communication with line 638, it is often the case that the sensor is internal to the fuel cell itself. The fuel cell also exhausts an anode waste gas and a cathode waste gas, both of which are shown as being passed to hydrogen generator 602 via lines 640 and 642 respectively. These streams may be used for heat exchange as well as for combustion to generate heat, e.g., for preheating the fuel. A flue gas exhaust from hydrogen generator exits via line 644.

Figure 7:
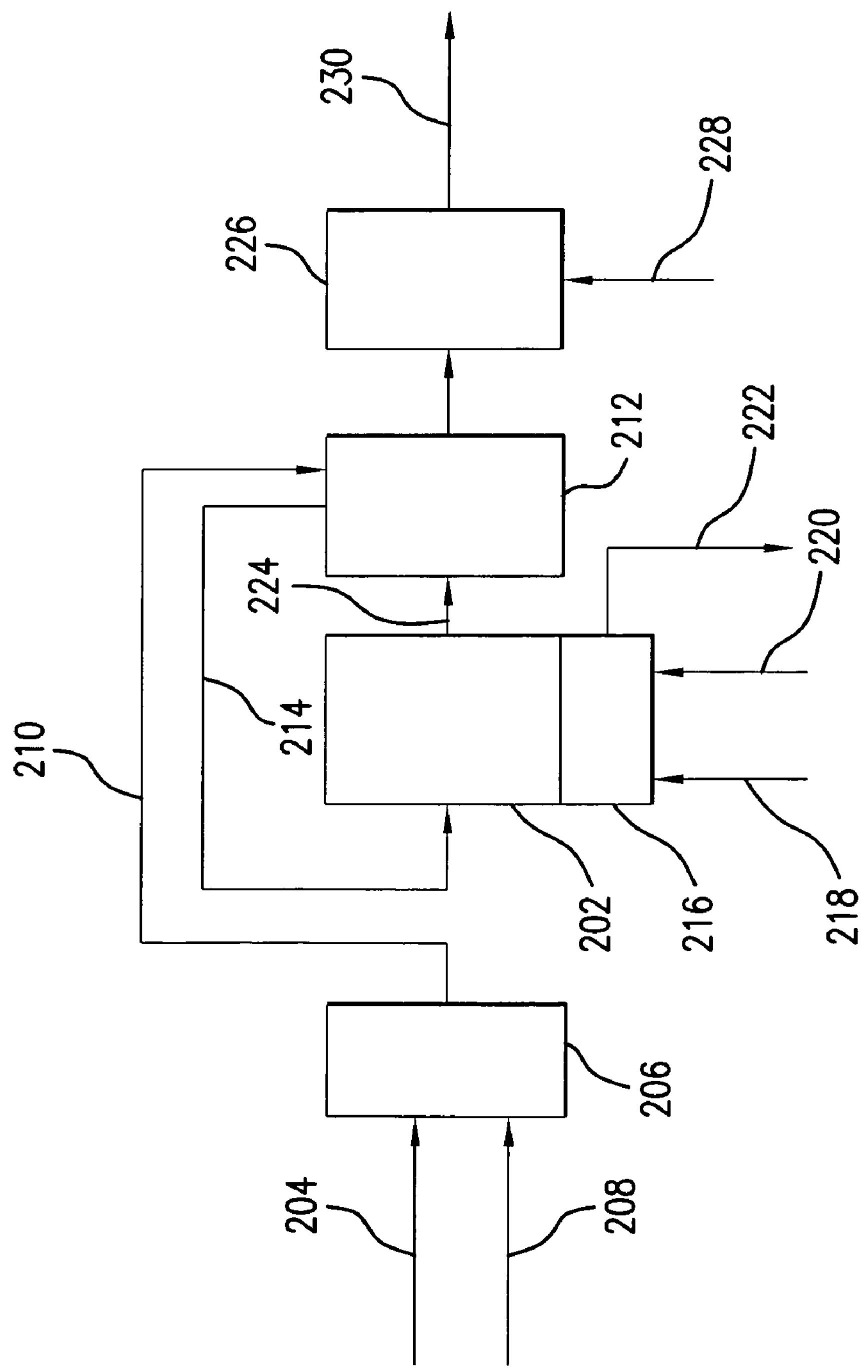
FIG. 7 is a schematic depiction of a steam reformer section of a hydrogen generator useful in the practice of the processes of this invention.

For a more detailed illustration of one way in which raw materials may be used in a hydrogen generator, reference is made to FIG. 7. In this figure, the use of a steam reformer 202 is depicted. A flow of fuel, $F_1$, is controlled at a predetermined rate and passed via line 204 to mixer/preheater 206. A flow of water, $W_1$, is controlled at a predetermined rate and passed via line 208 to mixer/preheater 206. Not shown is the source of the heat for mixer/preheater 206. The predetermined amounts of fuel and water are selected for the rate of hydrogen generation sought.

An admixture of the fuel and now steam is passed via line 210 to heat exchanger 212 where through indirect heat exchange it is heated by the reformate from reformer 202 and cools the reformate. The further heated admixture is passed via line 214 to reformer 202. Since steam reforming is endothermic and occurs at high temperatures, combustor 216 is provided in indirect heat exchange with reformer 202. As shown, a flow of fuel, $F_2$, is controlled at a predetermined rate and passed via line 218 to combustor 216 and a flow of air, $A_1$, is controlled at a predetermined rate and passed via line 220 to combustor 216. The $F_2$ flow rate is in an amount predetermined to maintain the reformer at a desired temperature for the endothermic steam reforming. Combustion effluent exits combustor 216 via line 222 and can be used for heat integration, for instance as the source of heat for mixer/preheater 206, and then exhausted from the hydrogen generator.

Reformate exits reformer 202 via line 224 and is passed through heat exchanger 212 and then to heat exchanger 226. Heat exchanger 226 uses the addition of water into the reformate for direct heat exchange. Water is passed via line 228 at a predetermined flow rate, $W_2$, to further cool the reformate to a desired temperature for further processing. The cooled reformate is passed via line 230 to the carbon monoxide conversion operation.

One sequence of operation during a change in hydrogen production rates is as follows. To effect a rapid increase in hydrogen production, $F_1$ and $W_1$ are increased at predetermined ramp-up rates, but in the same molar ratio. $F_2$ and $A_1$ also are increased at predetermined rates because more heat is needed to reform the greater flow of fuel, $F_1$ to the reformer. However, due to the time lag associated with indirect heat transfer from the burner flue gas to the reformer, $F_2$ and $A_1$ are increased more rapidly than $F_1$ and $W_1$ and more rapidly than if the transition to the higher hydrogen production rate were slower. This incremental excess heat input is used to compensate for the slow thermal response of the heat exchanger during the rapid turn-up and allows the reformer outlet temperature to remain essentially constant. If necessary to accommodate the speed of the turn-up, $F_2$ and $A_1$ may be greater than that required at steady state operation at the new hydrogen production rate. If so, $F_2$ and $A_1$ are reduced as steady state operation is approached to the appropriate rates for steady state operation at the new hydrogen production rate.

Also during the period of ramp up, the lag in thermal response in heat exchanger 212 will be accommodated by temporarily increasing the flow of water to heat exchanger 228 via line 226 ($W_2$). As the unit approaches steady state operation at the new hydrogen production rate, $W_2$, will be lower than before the transition commenced. It is readily apparent that similar sequencing of changes in flow rates can be done to achieve a rapid reduction in hydrogen production rate.

Figure 8:
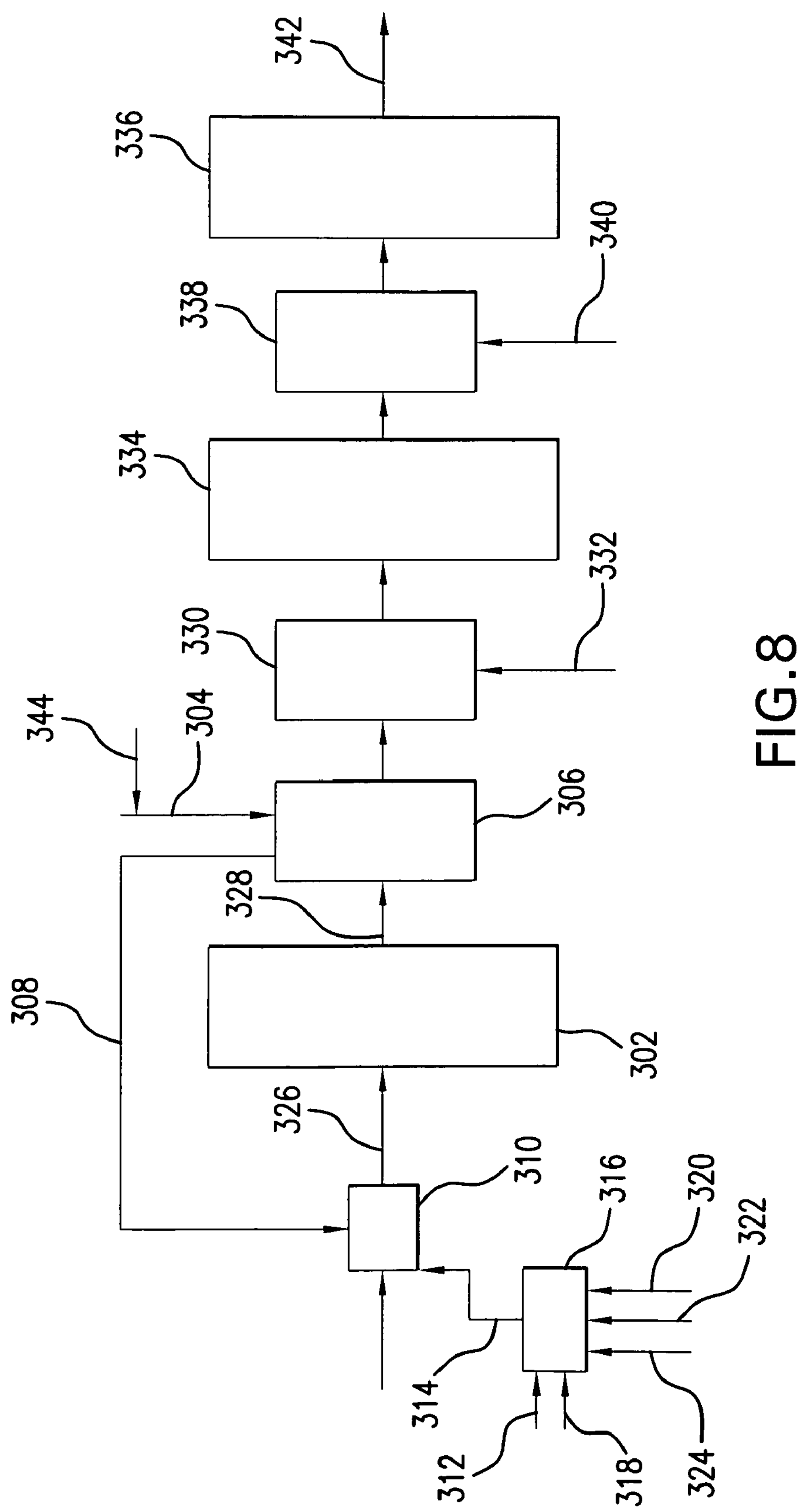
FIG. 8 is a schematic depiction of an autothermal reformer and water gas shift sections of a hydrogen generator useful in the practice of the processes of this invention.

FIG. 8 depicts an autothermal reformer and water gas shift section of a hydrogen generator. Autothemal reformer 302 uses a fuel, oxygen-containing gas and water feed. As shown, fuel passing through line 304 at a predetermined, controlled flow rate $F_1$, is admixed with steam via line 344. Line 344 usually contains low temperature steam recovered from the hydrogen generator, preferably from a preferential oxidation reactor. See the discussion of FIG. 9 and line 412.

This fuel/steam admixture is passed via line 304 to heat exchanger 306. The heated fuel is passed via line 308 to mixer 310. Water at a predetermined, controlled rate, $W_1$, via line 318 and an oxygen-containing gas at predetermined flow rate, $A_1$, from line 312 are passed to heat exchanger 316 to provide a steam and water-containing mixture. Heat exchanger 316 is heated by combusting anode waste gas via line 320 and cathode waste gas via line 322. As shown, a predetermined, controlled oxygen-containing gas flow, $A_3$, is also provided via line 324 for use in the combustion in the heat exchanger. The heated steam and oxygen-containing gas generated in heat exchanger 316 is passed via line 314 to mixer 310 for combination with the heated fuel and steam admixture from line 308.

The fuel, steam and oxygen-containing gas mixture is passed to reformer 302 via line 326. The reformate is passed from reformer 302 via line 328 for indirect heat exchange with the fuel in heat exchanger 306 and then to heat exchanger 330 which uses water injection into the reformate for further cooling. The water flow, $W_2$, is at a predetermined, controlled rate and is passed to heat exchanger 330 via line 332.

The cooled reformate is then passed to a two stage water gas shift reactor 334 and 336 having heat exchanger 338 between shift stages. Heat exchanger 338 also uses the injection of water for cooling the gases. The water flow, $W_3$, is at a predetermined, controlled rate and enters the heat exchanger via line 340. The reformate, having been subjected to the water gas shift reaction, is passed via line 342 for further processing, e.g., in a preferential oxidation reactor.

Figure 9:
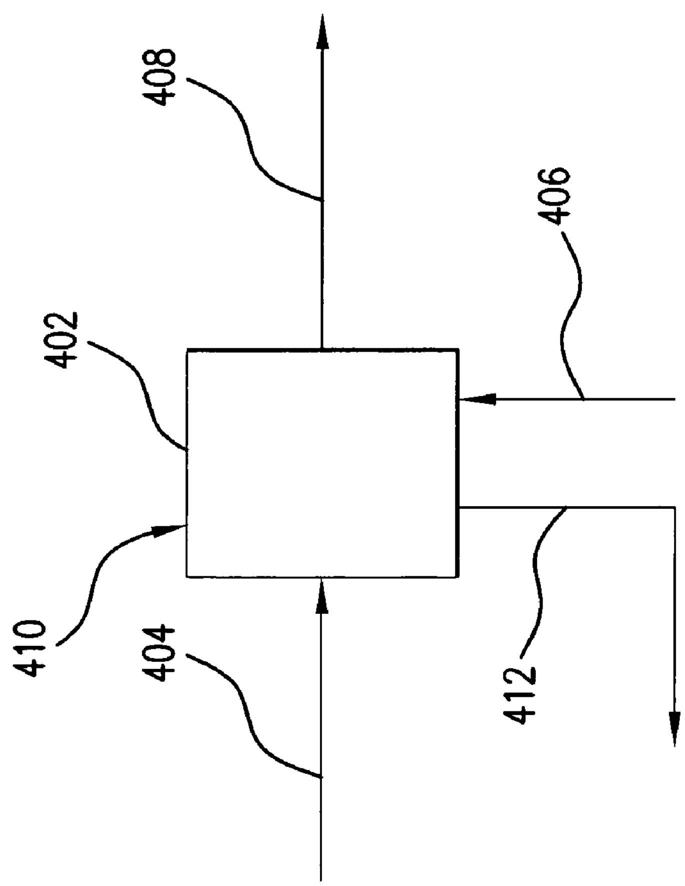
FIG. 9 is a schematic depiction of a preferential oxidation reactor section of a hydrogen generator useful in the practice of the processes of this invention.

FIG. 9 depicts a preferential oxidation section of a hydrogen generator. The preferential oxidation reactor 402 receives hydrogen-containing gas via line 404. The hydrogen-containing gas is generally obtained from a water gas shift reaction, which is usually at a higher temperature than desired for the preferential oxidation. If so, some cooling of the hydrogen-containing gas may be effected. Oxygen-containing gas flow, $A_2$, is provided via line 406 at a predetermined rate. A hydrogen product having a reduced concentration of carbon monoxide exits via line 408. As the preferential oxidation reaction is exothermic, a cooling stream is provided via line 410. Typically, the cooling stream is water and low pressure steam is generated as the heat of reaction is removed. In this manner, the preferential oxidation can be operated at a desirable temperature. The steam is recovered via line 412. The hydrogen-containing stream in line 408 is often cooled with condensed water being removed, prior to entry into the anode side of a fuel cell.

It is typical that when the hydrogen production rate is increased, during the transition the concentration of carbon monoxide in the gases passing to the preferential oxidation reactor increases. Advantageously, the oxygen-containing gas flow rate via line 406 is increased beyond that predetermined for steady state operation at the new hydrogen production rate to maintain the carbon monoxide concentration in the hydrogen product exiting via line 408 at an acceptable level.

Figure 10:
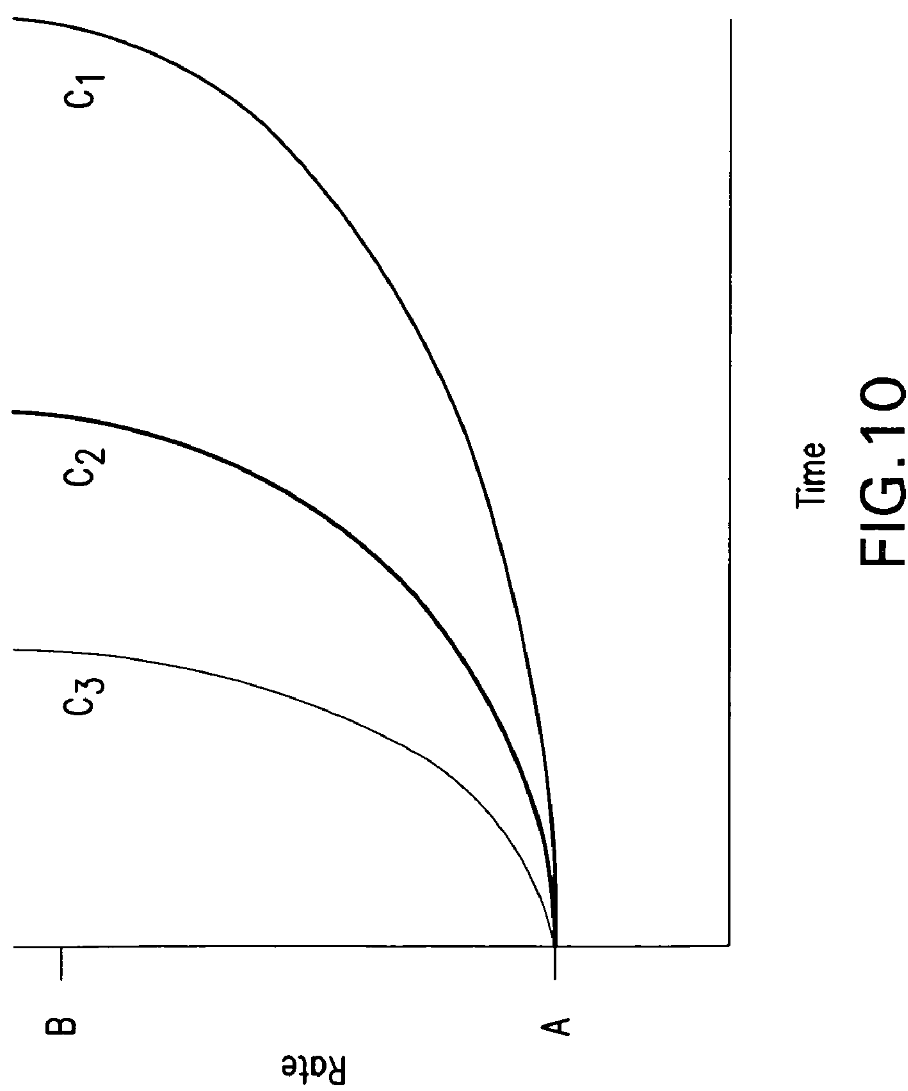
FIG. 10 is an illustrative depiction of the practical maximum rate of change of conditions from a first hydrogen production rate to a second hydrogen production rate.

FIG. 10 is an illustration of the responses of three conditions in a hydrogen generator to a change from hydrogen production rate A to rate B. Condition $C_1$ has a slow transient response, e.g., it may be the steam production rate from an indirect heat exchange, whereas condition $C_2$ is more rapid, e.g., a catalyst temperature, and condition $C_3$ is even more rapid, e.g., fuel to oxygen-containing gas ratio in the feed to the reformer. $C_1$ would, amongst the three conditions, be the transition rate-limiting operation. Assuming for purposes of illustration that the changes in $C_1$ to $C_2$ to $C_3$ are to occur simultaneously, in accordance with the present invention, the rate of change of $C_2$ and $C_3$ would be controlled in a predetermined manner to coincide with the change in $C_1$. This control would be through adjusting the flows of the externally-provided raw materials at a predetermined change rate to the set of predetermined conditions for the new hydrogen production rate.

What is claimed is:

1. A process for operating a hydrogen generator having a variable hydrogen production rate output comprising:

providing raw materials at effective feed rates into the generator to meet a hydrogen production rate demand of the generator, the raw materials including a hydrocarbon feed, an oxygen gas and water;

reforming the hydrocarbon feed in the presence of steam to produce a reformate comprising hydrogen, carbon monoxide and carbon dioxide;

converting at least some of the carbon monoxide in the reformate to carbon dioxide;

at least partially combusting the hydrocarbon feed with the oxygen gas to provide heat for the reforming step;

determining conditions of the generator including at least process temperatures;

determining conditions of the raw materials;

selecting predetermined feed rates for the raw materials using the conditions of the generator, the conditions of the raw materials and a look up table of predetermined values; and controlling a feed rate of each of the raw materials to substantially the predetermined feed rates.

2. The process of claim 1 further comprising providing the hydrogen to a fuel cell to generate electricity over a range of electricity production rates and the hydrogen production rate is established by a demand for the hydrogen by the fuel cell.

3. The process of claim 1 wherein the values are specific to the hydrogen production rate demand of the generator.

4. The process of claim 1 wherein the conditions of the generator are ascertained using sensors.

5. The process of claim 1 wherein the conditions of the raw materials are established using a cascade control process.

6. The process of claim 1 wherein the values are established by an algorithm.

7. The process of claim 6 wherein the conditions of the raw materials include a fuel value of the hydrocarbon feed.

8. The process of claim 7 wherein cascade control establishes the algorithm.

9. A process for operating a hydrogen generator comprising:

providing raw materials at effective feed rates into the hydrogen generator, said the materials comprising fuel, an oxygen gas, and water, reforming the fuel in the presence of steam to produce a reformate comprising hydrogen, carbon monoxide and carbon dioxide;

converting at least some of the carbon monoxide to carbon dioxide;

determining conditions of the generator;

determining conditions of the raw materials;

selecting predetermined feed rates for the raw materials using the conditions of the generator, the conditions of the raw materials and a look up table of predetermined values;

controlling a feed rate of each of the raw materials to substantially the predetermined feed rates;

performing a transition rate-limiting operation; and controlling a rate of change of the feed rate of each of the raw materials in accordance with a predetermined rate commensurate with the rate of change in the transition rate-limiting operation.

10. The process of claim 9 wherein the generator provides the hydrogen to a fuel cell to generate electricity over a range of electricity production rates and the hydrogen production rate is established by the electricity production rate.

11. The process of claim 9 wherein the conditions of the raw materials include a fuel value of the fuel.

12. The process of claim 9 wherein converting step is performed by preferential oxidation in the presence of free oxygen.

13. The process of claim 9 wherein the conditions of the generator include process temperatures, effluent temperature and system pressure.

14. The process of claim 9 wherein the controlling the rate of change step is performed to attenuate adverse transient responses.

15. A method for operating a hydrogen fuel processor with low levels of carbon monoxide comprising: adjusting a water to hydrocarbon fuel ratio and an air to hydrocarbon fuel ratio in accordance with a predetermined algorithm, wherein said fuel processor comprises a supply of said hydrocarbon fuel, and water and steam supplied to a reactor to produce hydrogen fuel comprising hydrogen and carbon monoxide, followed by the reduction in concentration of said carbon monoxide in said hydrogen fuel by passing said hydrogen fuel first to at least one water gas shift reactor and then to at least one preferential oxidation reactor, wherein said water is added to the hydrocarbon fuel prior to said hydrocarbon fuel entering said reactor, and wherein air is added to said at least one preferential oxidation reactor in accordance with said algorithm, wherein said algorithm comprises determining a target hydrocarbon fuel flow (B) and a current hydrocarbon fuel flow (A), then determining a present difference (D)=(B)−(A), and then comparing said difference (D) with a predetermined threshold value to determine whether said fuel processor is turning up production of hydrogen, turning down production of hydrogen or operating at a steady state mode and wherein a higher ratio of water to fuel and air to fuel is added when said fuel processor is turning up production for a preset period of time than when said fuel processor is operating at a steady state mode and wherein a lower ratio of water to fuel and air to fuel is added when said fuel processor is in a turning down of production mode.

16. The method of claim 15 wherein said target hydrocarbon fuel flow and current fuel flow are measured periodically and said difference is then calculated to determine whether to increase, decrease or not change said ratios of water to fuel and air to fuel.

17. The method of claim 15 wherein upon a change from said turning up mode or said turning down mode to said steady state mode, there is a delay for a preset period of time prior to commencement of said predetermined ratio for said steady state mode.

18. The method of claim 15 wherein the fuel processor contains at least two preferential oxidation reactors, wherein an approximately equal flow of air is added to each of said preferential oxidation reactors.

19. The method of claim 15 wherein after said hydrogen fuel passes through said preferential oxidation reactors, said hydrogen fuel contains no more than 50 ppmv carbon monoxide at any time during operation of said preferential oxidation reactors.

* * * * *